(12) United States Patent
Yamamoto et al.

(10) Patent No.: US 6,282,563 B1
(45) Date of Patent: Aug. 28, 2001

(54) AGENT MOVING METHOD, MESSAGE TRANSMISSION METHOD, AGENT TRANSMISSION METHOD, AGENT ACQUISITION METHOD, MESSAGE ACQUISITION METHOD AND AGENT LIST ACQUISITION METHOD, AND COMPUTER

(75) Inventors: Gaku Yamamoto, Tokyo-to; Kazuya Kosaka; Mitsuru Oshima, both of Kanagawa-ken, all of (JP); Danny B. Lange, Holte (DK)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/087,214

(22) Filed: May 29, 1998

(30) Foreign Application Priority Data

May 30, 1997 (JP) .................................................. 9-141358

(51) Int. Cl.[7] ........................... G06F 15/16; G06F 15/173
(52) U.S. Cl. ........................ 709/202; 709/239; 709/238; 709/217; 709/232
(58) Field of Search .................................. 709/239, 217, 709/219, 201, 226, 232, 335, 332, 202

(56) References Cited

U.S. PATENT DOCUMENTS

| 4,543,627 |   | 9/1985  | Schwab .                    |
|-----------|---|---------|-----------------------------|
| 5,230,051 | * | 7/1993  | Quan .................. 709/312 |
| 5,418,913 |   | 5/1995  | Fujimoto .                  |
| 5,550,976 | * | 8/1996  | Henderson et al. ....... 709/201 |
| 5,613,073 |   | 3/1997  | Hamond, Jr. et al. .        |
| 5,680,623 |   | 10/1997 | Onuma .                     |
| 5,758,157 | * | 5/1998  | Greenstein et al. ........ 709/5 |
| 5,790,790 | * | 8/1998  | Smith et al. ............ 709/206 |
| 5,926,623 | * | 7/1999  | Tsukakoshi et al. ....... 709/200 |
| 5,951,639 | * | 9/1999  | MacInnis ............... 709/217 |
| 5,987,504 | * | 11/1999 | Toga .................... 709/206 |
| 6,035,339 | * | 3/2000  | Agraharam et al. ....... 709/246 |
| 6,044,205 | * | 3/2000  | Reed et al. ............. 709/201 |
| 6,122,672 | * | 9/2000  | Vyaznikov et al. ........ 709/238 |

FOREIGN PATENT DOCUMENTS

| 0 097 028 A2 |   | 6/1993  | (EP) .                   |
|--------------|---|---------|--------------------------|
| 0782304 A2   | * | 12/1996 | (EP) ........... H04L/12/58 |
| 0 753 811 A1 |   | 1/1997  | (EP) .                   |
| 2 270 821    |   | 3/1994  | (GB) .                   |
| 2 277 425    |   | 10/1994 | (GB) .                   |
| 2 298 109    |   | 8/1996  | (GB) .                   |
| 2 300 544    |   | 11/1996 | (GB) .                   |
| 2 301 264    |   | 11/1996 | (GB) .                   |
| 2 318 434    |   | 4/1998  | (GB) .                   |
| 2 321 981    |   | 8/1998  | (GB) .                   |
| 9-179807     |   | 7/1997  | (JP) .                   |

OTHER PUBLICATIONS

Thomsen et al., "Mobile agents set to work", Communications International, London, vol. 22, Issue 7, Jul. 1995.*

* cited by examiner

Primary Examiner—Dung C. Dinh
Assistant Examiner—Bradley Edelman
(74) Attorney, Agent, or Firm—Scully, Scott, Murphy & Presser; Robert P. Tassinari, Esq.

(57) ABSTRACT

The present invention is directed to a mobile agent technique, and in particular to a method for moving/transmitting to a desired computer, an agent and a message that the agent issues. According to the present invention, a temporary storage area (a computer having a storage device) for a destination computer of a mobile agent and a message is provided. When a mobile agent or a message can not move directly to a destination computer, the mobile agent and the message are temporarily stored in the temporary storage area. At an appropriate time, the destination computer extracts from the temporary storage area the agent and the message addressed to it. Since the temporary storage area is provided, the movement of the agent and the transmission of the message are ensured. Also because the temporary storage device is provided, the destination computer can accept a mobile agent and a message in accordance with the situation and the condition of the destination computer.

19 Claims, 20 Drawing Sheets

AGENT MOVING METHOD, MESSAGE TRANSMISSION METHOD, AGENT TRANSMISSION METHOD, AGENT ACQUISITION METHOD, MESSAGE ACQUISITION METHOD AND AGENT LIST ACQUISITION METHOD, AND COMPUTER

BACKGROUND OF THE INVENTION

1. Technical Field

The present invention relates to a mobile agent technique, and in particular to a method for moving/transmitting to a desired computer, an agent and a message that the agent issues.

2. Prior Art

A mobile agent is an agent that moves between computers, and conventionally it moves directly from a source computer to a destination computer. Specifically, when a destination computer is designated, a mobile agent tends to move to the designated destination computer, regardless of the condition of that computer.

According to the conventional method, an agent can not move to a destination computer when it is not connected to a network, because of a maintenance check, or when the computer is not active, resulting in an error. When the computer is connected to a network, such as the Internet, a countermeasure for the prevention of inappropriate external accesses, such as the employment of a firewall, is frequently provided. In such a case, since the mobile agent that attempts to access the computer is outside the firewall, the mobile agent can not reach the target computer over the firewall. This case also results in an error.

The above events can also occur when a mobile agent that is active in a specific computer transmits a message to a mobile agent that is active in another computer.

There is a case where a user of a computer that is the destination of a mobile agent seeks to limit the mobile agents that are active in the user's computer to suitable ones. In addition, although a destination computer may accept any mobile agent, it is desirable that only a limited number of mobile agents are active in a computer at one time (or for a specific time). In the above cases, if the only method for directly moving a mobile agent from a source computer to a destination computer is available, it may be inconvenient for the destination computer and the mobile agent.

SUMMARY OF THE INVENTION

Accordingly, to resolve the above shortcomings, it is one object of the present invention to permit the movement of a mobile agent to a destination computer, regardless of the condition of the destination computer.

It is another object of the present invention to provide a mechanism that enables the reception of the mobile agent in accordance with the circumstances of a destination computer.

It is an additional object of the present invention to perform the above operation for a message issued by a mobile agent.

BRIEF DESCRIPTION OF THE DRAWINGS

Preferred embodiments of the present invention will now be described, by way of example only, with reference to the accompanying drawings, in which.

DETAILED DESCRIPTION OF THE PREFERRED EMBODIMENTS OF THE INVENTION

Figure 1:
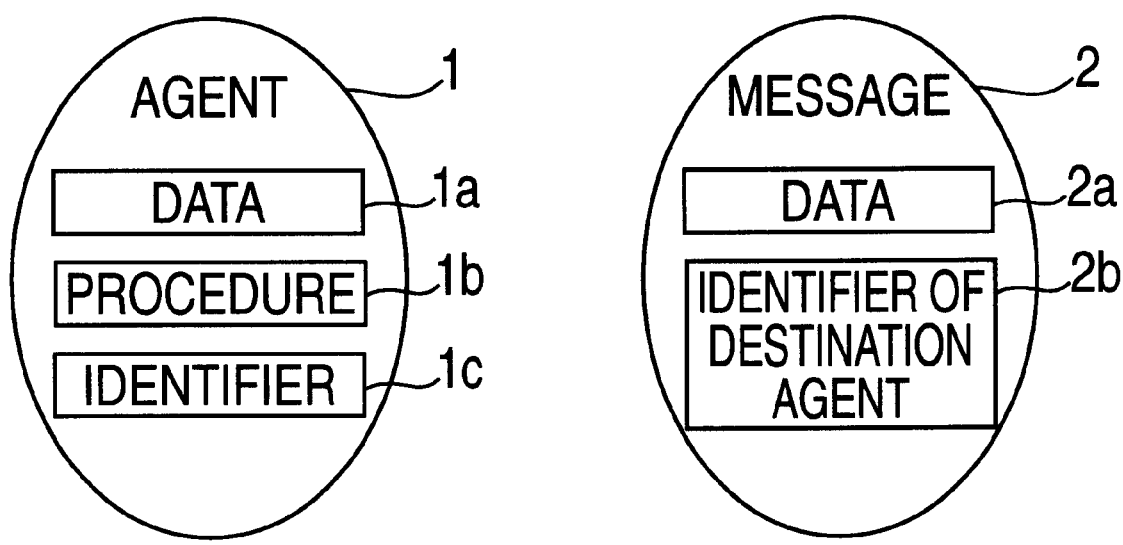
FIG. 1 is a diagram illustrating the structures of an agent and a message according to one embodiment of the present invention.

According to the present invention, a temporary storage area (a computer having a storage device) for a destination computer of a mobile agent and a message is provided. When a mobile agent or a message can not move directly to a destination computer, the mobile agent and the message are temporarily stored in the temporary storage area. At an appropriate time, the destination computer extracts from the temporary storage area the agent and the message addressed to it. Since the temporary storage area is provided, the movement of the agent and the transmission of the message are ensured. Also because the temporary storage device is provided, the destination computer can accept a mobile agent and a message in accordance with the situation and the condition of the destination computer.

An explanation will be given for the operations performed by a destination computer, a source computer and a temporary storage computer. A method performed by a first computer, which is a source, to move an agent from the first computer comprises the steps of: converting the agent into a bit sequence for transmission of the agent; checking whether a second computer which is a destination of the agent can receive the bit sequence; and transmitting an address of the second computer and the bit sequence to the temporary storage computer when it is determined that the second computer cannot receive. When the agent can not move directly to the destination, in principle, the temporary storage computer is employed. When it is determined that the second computer can receive the bit sequence, an address of the second computer and the bit sequence are transmitted to the second computer.

The step of checking whether the second computer can receive the bit sequence can be performed by transmitting to the second computer a movement confirmation request, including an address of the first computer, and by determining whether an acknowledgement response or a rejection response for the movement confirmation request is received from the second computer. The step can be performed by checking whether the transmission of a movement confirmation request is successfully completed or not.

A method performed by a second computer, which is a destination, for moving an agent from a first computer, which is a source computer, comprises the steps of: determining whether the second computer can receive an agent in response to receiving an agent reception request from the first computer; transmitting a response representing receptibility to the first computer when the second computer can receive the agent; receiving a bit sequence for transmission of the agent from the first computer; and converting the bit sequence to generate an agent having a form executable in the second computer. When the second computer cannot receive, a response not representing receptibility may be transmitted.

The above described method can be employed for a message issued by a mobile agent. However, the second computer converts a bit sequence for the transmission of a message into a form interpretable for an agent being executed in the second computer, and transmits the converted message to the agent.

When the first computer, which is the source computer, transmits a bit sequence for the transmission of an agent to the temporary storage computer for the second computer, which is the destination computer, the temporary storage computer performs the following process. The temporary storage computer receives a bit sequence for transmission of an agent and an address of a destination computer of the agent, and checks the address of the destination computer. When the address is of the second computer, the bit sequence is stored in a region for the second computer in the temporary storage computer.

As the storage method, the bit sequence can be held as a file, or can be stored in a database in the temporary storage computer.

The processing performed by the temporary storage computer can be employed to store a bit sequence for the transmission of a message.

However, since the message is to be transmitted to a specific agent, an identifier of a destination agent is checked in the bit sequence for the transmission of the message, and the bit sequence for the transmission of the message may be stored in a region for the second computer in the temporary storage computer so as to correspond to the destination agent of the message.

To transmit the stored agent to a destination computer, the temporary storage computer performs the steps of: receiving an agent acquisition request that includes an address of a requesting source from the destination computer; checking the address of the requesting source in the agent acquisition request; checking a region for the destination computer in the temporary storage computer when the address of the requesting source is an address of the destination computer; taking out a bit sequence for an agent stored in the region for the destination computer; and transmitting the taken bit sequence for the agent to the destination computer.

At this time, the checking step may include a step of adding a mark to the bit sequence for the agent when the bit sequence for the agent is present in the region for the destination computer.

In addition, the temporary storage computer may perform a step of receiving an acknowledgement of an agent from the destination computer, and a step of deleting, in response to the reception of the acknowledgement, the bit sequence for the agent with the mark from the region for the destination computer in the temporary storage computer.

Further, the temporary storage computer may perform a step of receiving the acknowledgement of an agent from the destination computer, and a step of storing, in response to the reception of the acknowledgement, the bit sequence for the agent with the mark separately from a bit sequence without the mark.

The above described method, performed by the temporary storage computer for transmission of a stored agent to a destination computer is also performed for transmission of message.

The process performed when a destination computer acquires from a temporary storage computer a bit sequence for an agent comprises the steps of: transmitting an agent acquisition request to the temporary storage computer; receiving the bit sequence for transmission of the agent from the temporary storage computer; and converting the received bit sequence for the agent into a form executable by the computer. This process is also performed to acquire a message. In this case, a process is required for checking a destination agent of an acquired message and for transmitting the message to the destination agent.

In addition, a method for acquiring an agent and a message at the same time can be employed. With this method, when a bit sequence for an agent or for a message is present in a region for a destination computer, a mark is added to the bit sequence for the agent or for the message.

Further, it is also possible to instruct a destination computer to acquire from a temporary storage computer a list of agents addressed to the destination computer, and either to select and acquire a specific agent on the list, or to select and delete a specific agent on the list. Such a list can also be employed for messages; however, since a message transmission will result in an error when an agent has not been moved to the destination computer and activated, a problem may arise in the selection and the acquisition of messages separately from agents.

The above description is explained in view of the processing performed by the source computer, the destination computer and the temporary storage computer. But this invention can also be grasped as a computer which performs the above processings. In addition, the above processing can be implemented by a computer program, which is normally distributed by being stored on a memory medium, such as a CD-ROM or a floppy disk.

The preferred embodiments will now be described referring to the accompanying drawings.

Example constitutions of agent 1 and message 2 in one embodiment are shown in FIG. 1. An agent 1 has data $1a$ representative of its condition and owned information, procedure $1b$ representative of its behavior, and identifier $1c$ for identifying the agent. The agent 1 can move between computers by freezing the condition of the operation in one computer and thawing the condition in another computer after being transferred.

The agent 1 can transmit information, such as a request or a response, to another agent. The agent 1 employs a message for this transmission. A message 2 has data $2a$ and an identifier $2b$ of a destination agent. The message 2 is transmitted even when a destination agent and a source agent are active on different computers.

Before the embodiment of the present invention is explained, the outline of a procedure for the conventional movement of an agent will be described referring to FIG. 2, and the outline of the procedure for the transfer of a message will be described referring to FIG. 3.

Logical space 6, where an agent can be active, is provided for a source computer 3, and the agent 1 is active therein. A transmitter 7 of an agent movement processing mechanism for moving an agent is also provided. An agent destination computer 4 comprises a receiver 8 of an agent movement processing mechanism and logical space 6 in which an agent can be active. The source computer 3 and the destination computer 4 are connected to each other by a network 5.

The outline of the processing for moving an agent will now be described. When the agent 1 moves from the source computer 3, where it is currently active, to the destination computer 4, first, the transmitter 7 of the agent movement processing mechanism performs an agent freezing process 9, to convert it into a bit sequence 11 for the frozen agent which includes, as a bit sequence, data $1a$ and the procedure $1b$. The converted bit sequence 11 is transferred via the network 5 to the destination computer 4. The bit sequence 11 is received by the receiver 8 of the agent movement processing mechanism, and a frozen agent reproduction process 10 converts the bit sequence into agent 1, which has data $1a$ and the procedure $1b$, and the agent 1 becomes active in the logical space 6 in the destination computer 4.

In the agent freezing process 9, the job the agent is currently processing is temporarily halted, and data currently held by the agent, information concerning program code of the agent and configuration information required for the reconstruction of the agent later, are embedded into a bit sequence. Example information concerning program code is the name of program code, version information and program code itself. As the basic technique of the agent freezing process, an example implementation method is described in "Pickling State In The Java Systems," The 2nd USENIX Conference On Object-Oriented Technologies, 1996.

When an agent for transferring a message and an agent for receiving a message are active in different computers, transfer of a message must be performed via a network. An example arrangement and an outline of the required processing are shown in FIG. 3. A message transfer source computer 13 includes a logical space 6 where an agent 1 is active and a transmitter 15 of a message transfer processing mechanism. A message transfer destination computer 14 includes a logical space 6 where an agent $1a$ for receiving messages is active. The message transfer source computer 13 and the message transfer destination computer 14 are connected together by the network 5.

The outline of the message transfer processing will now be described. The agent 1 generates the message 2. The transmitter 15 of the message transfer processing mechanism performs conversion process 17 to convert the message 2 into a bit sequence 18 for a message. The bit sequence 18 is received by a receiver 16 of a message transfer processing mechanism at the message transfer destination computer 14. The receiver 16 performs a message conversion process 19 for the received bit sequence to obtain the message 2, and transmits it to a destination agent $1d$.

Figure 2:
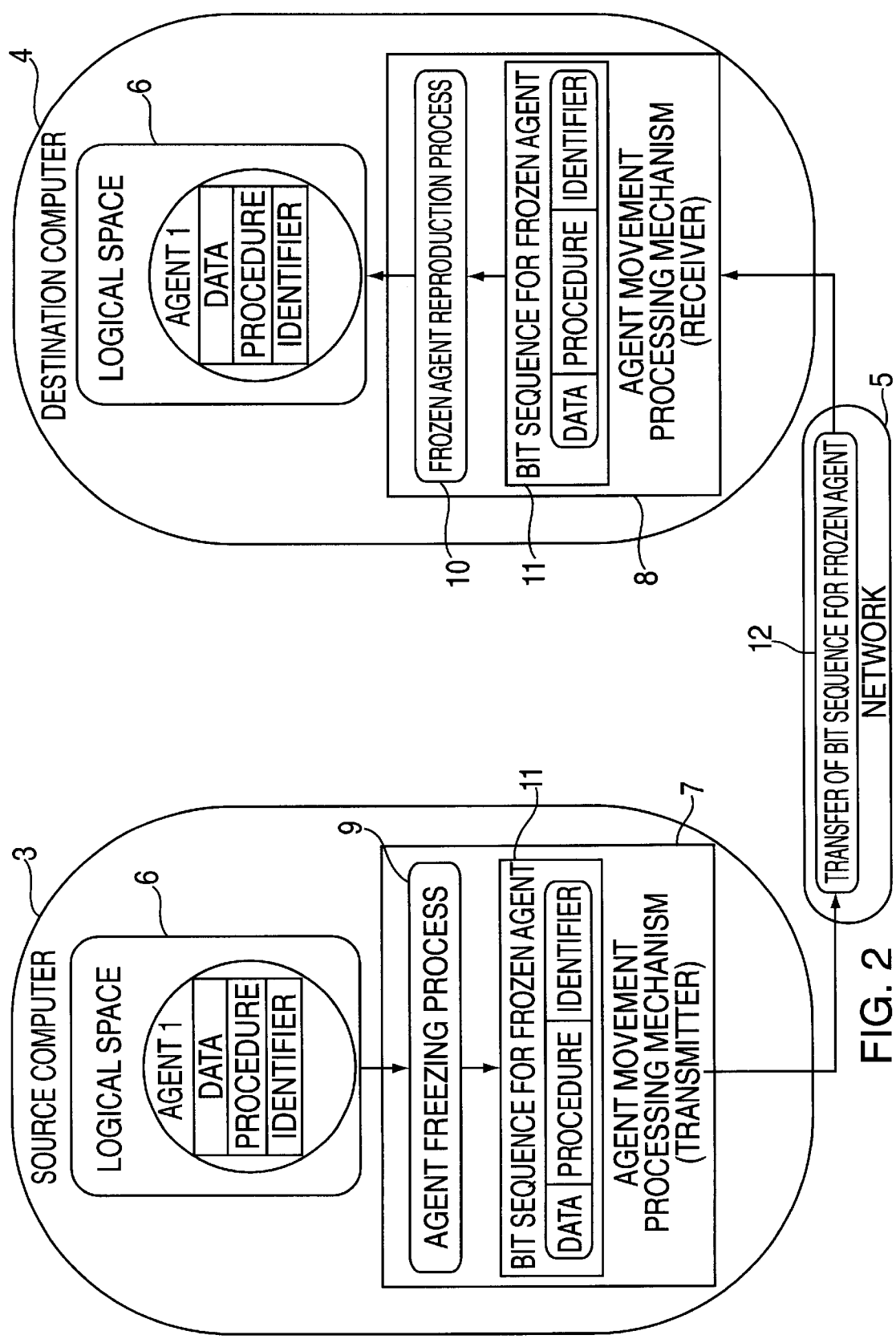
FIG. 2 is a schematic diagram illustrating a conventional configuration for moving an agent.
Figure 3:
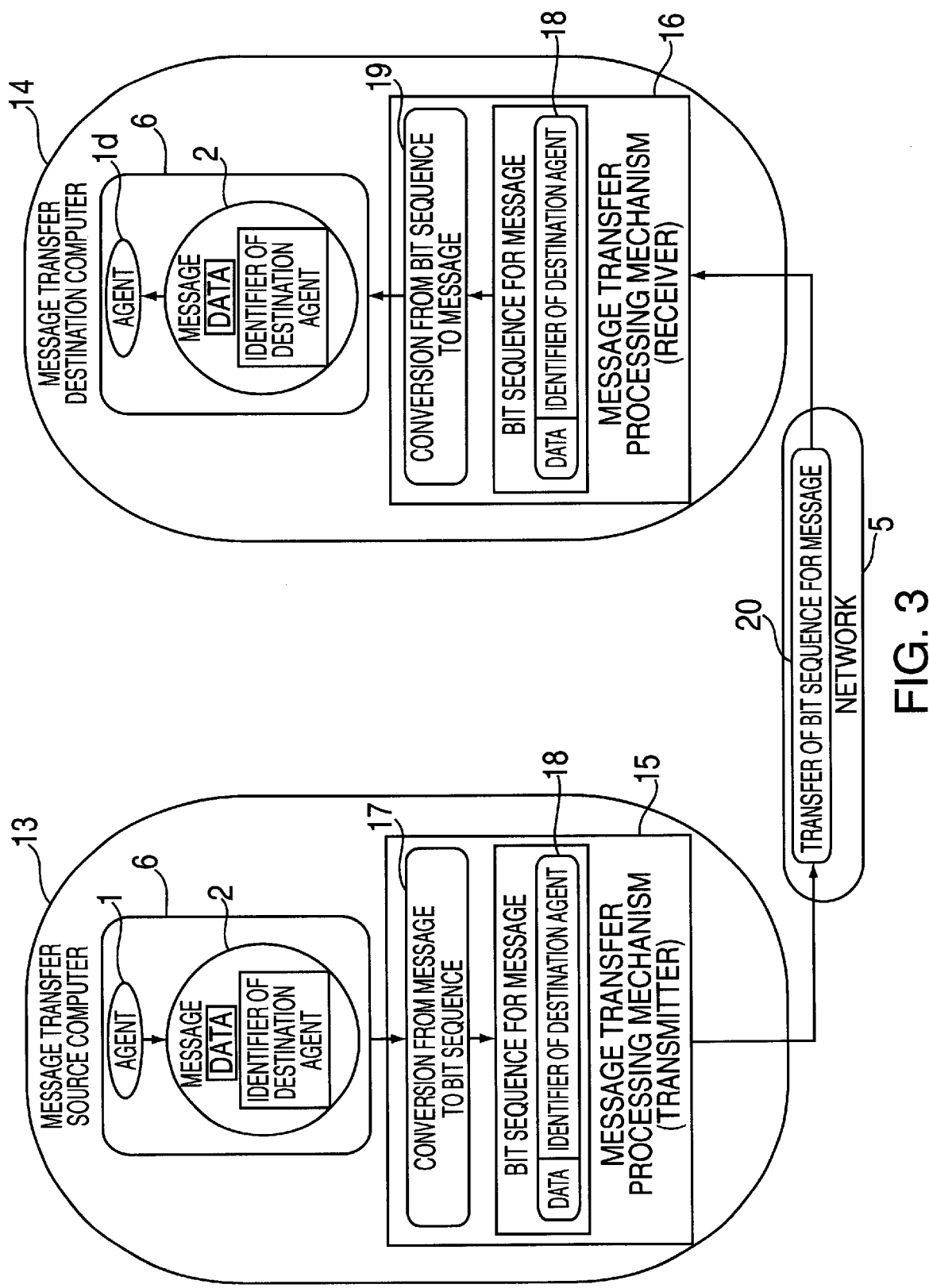
FIG. 3 is a schematic diagram illustrating a conventional configuration for transferring a message.
Figure 4:
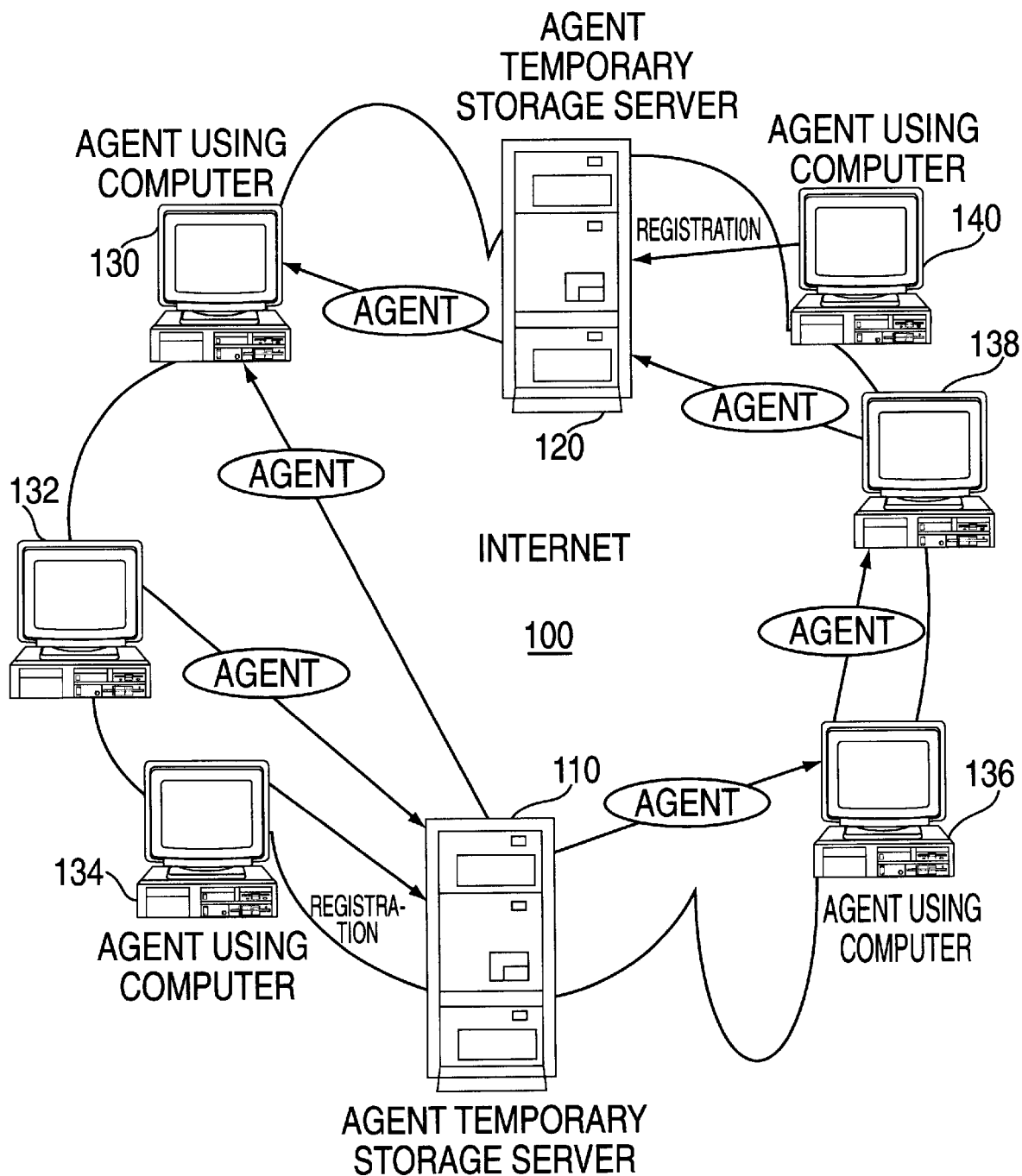
FIG. 4 is a diagram illustrating the arrangement for an agent temporary storage server and computers employing agents on the Internet.
Figure 5:
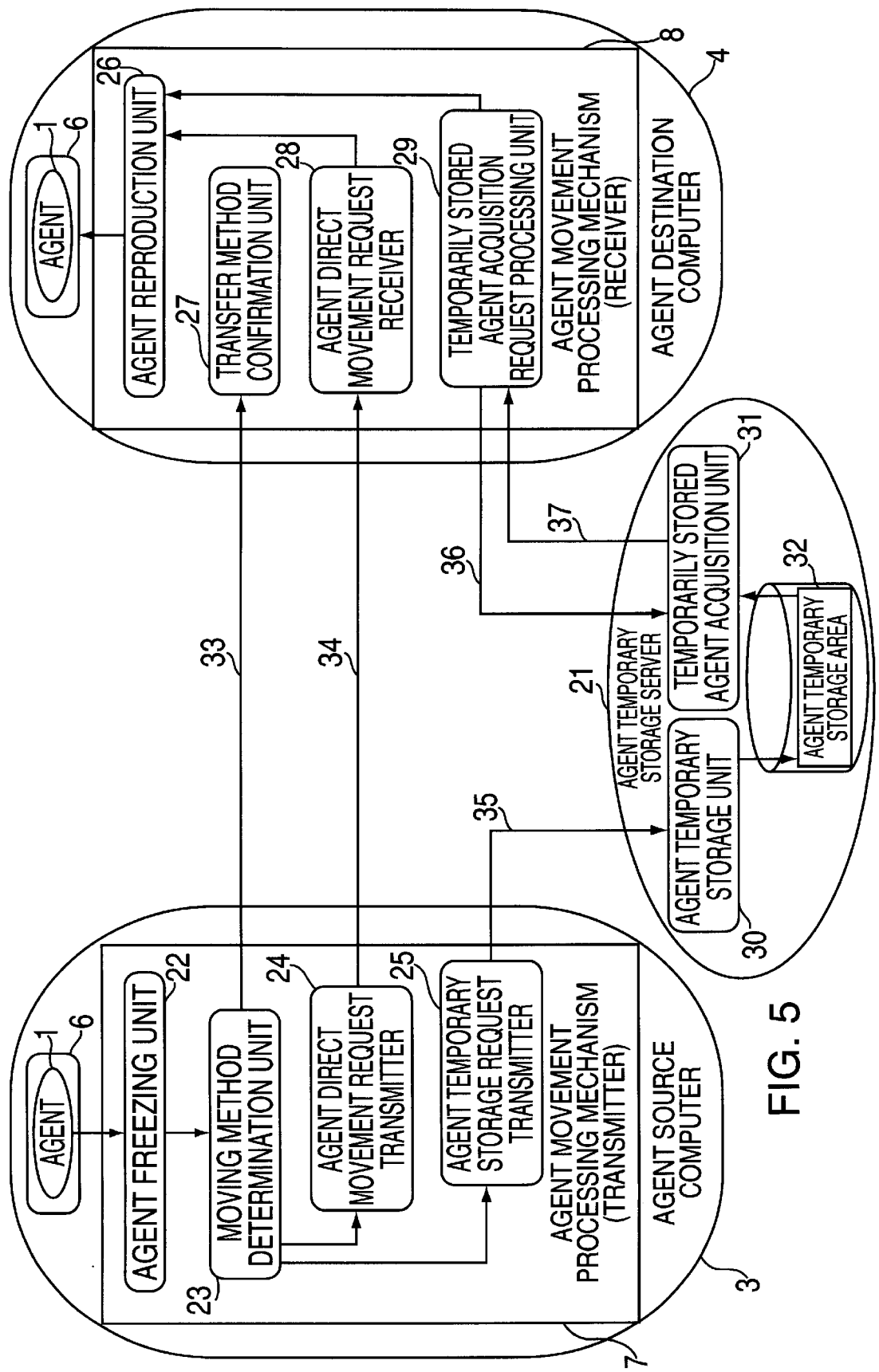
FIG. 5 is a diagram illustrating a configuration according to the embodiment for agent movement where a temporary storage area is provided.
Figure 6:
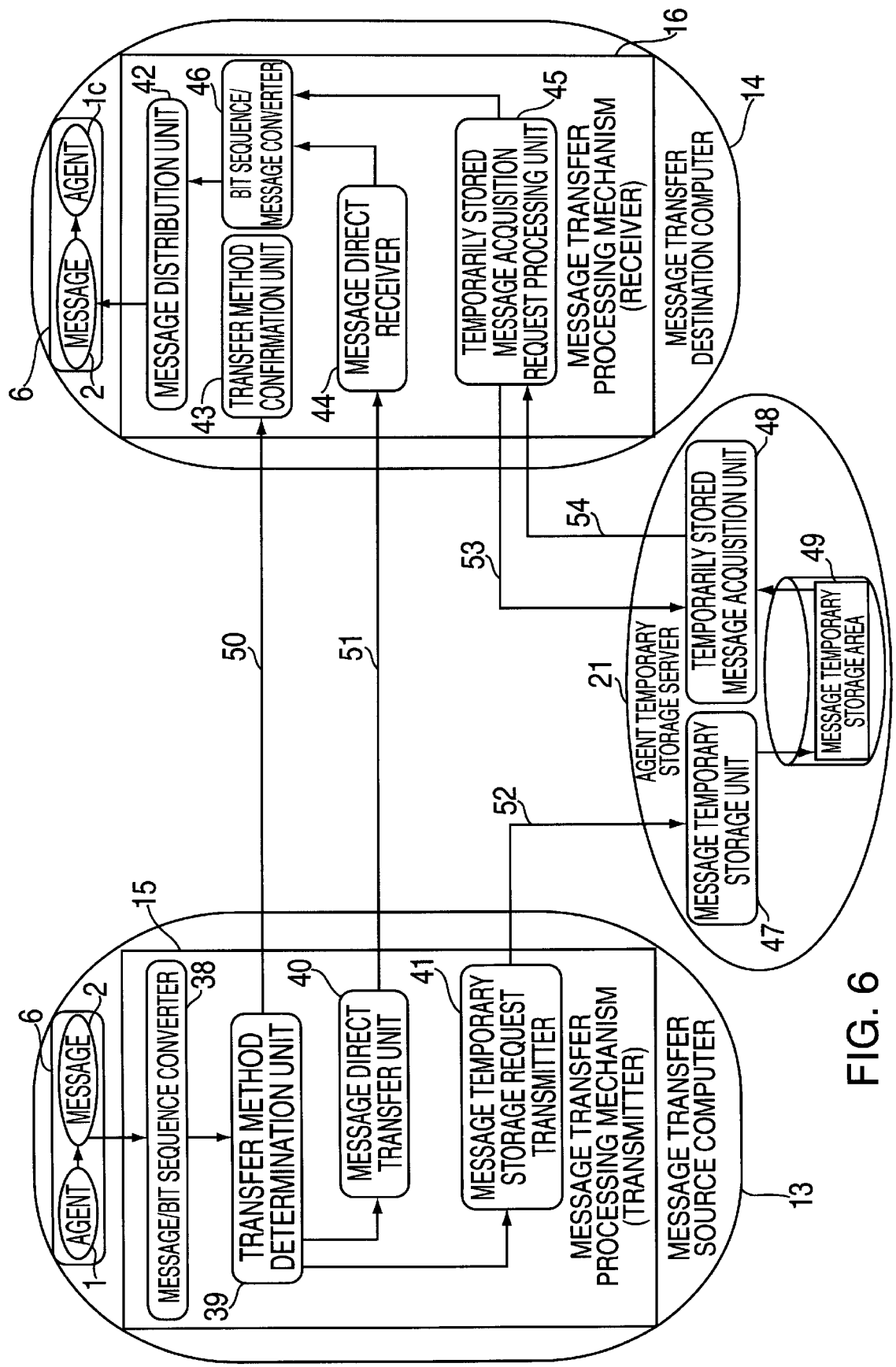
FIG. 6 is a diagram showing a configuration according to the embodiment for message transfer where a temporary storage area is provided.
Figure 7:
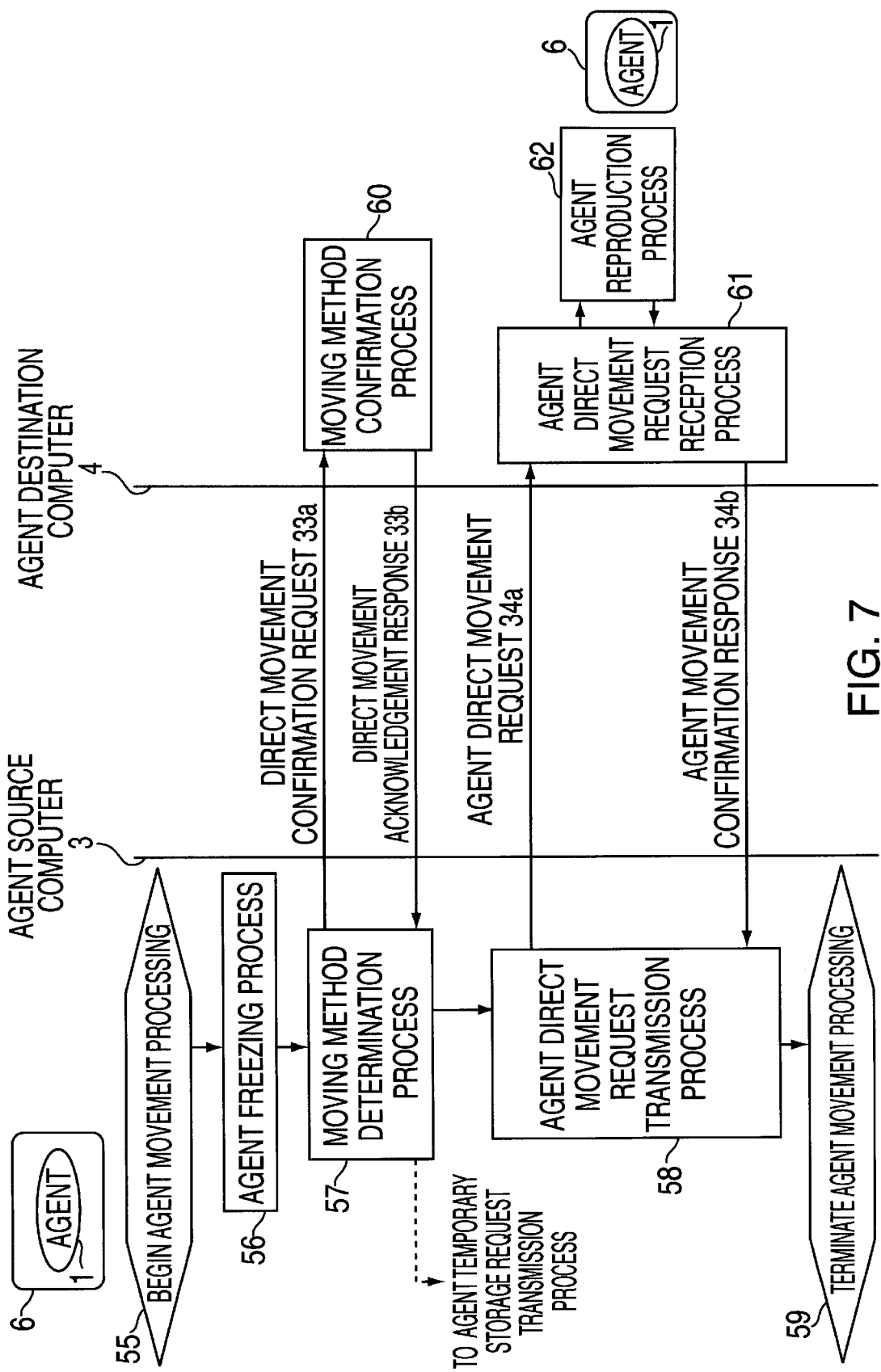
FIG. 7 is a diagram illustrating agent moving processing, in an arrangement wherein a temporary storage area is provided according to the embodiment, when an agent can move directly from a source computer to a destination computer.
Figure 8:
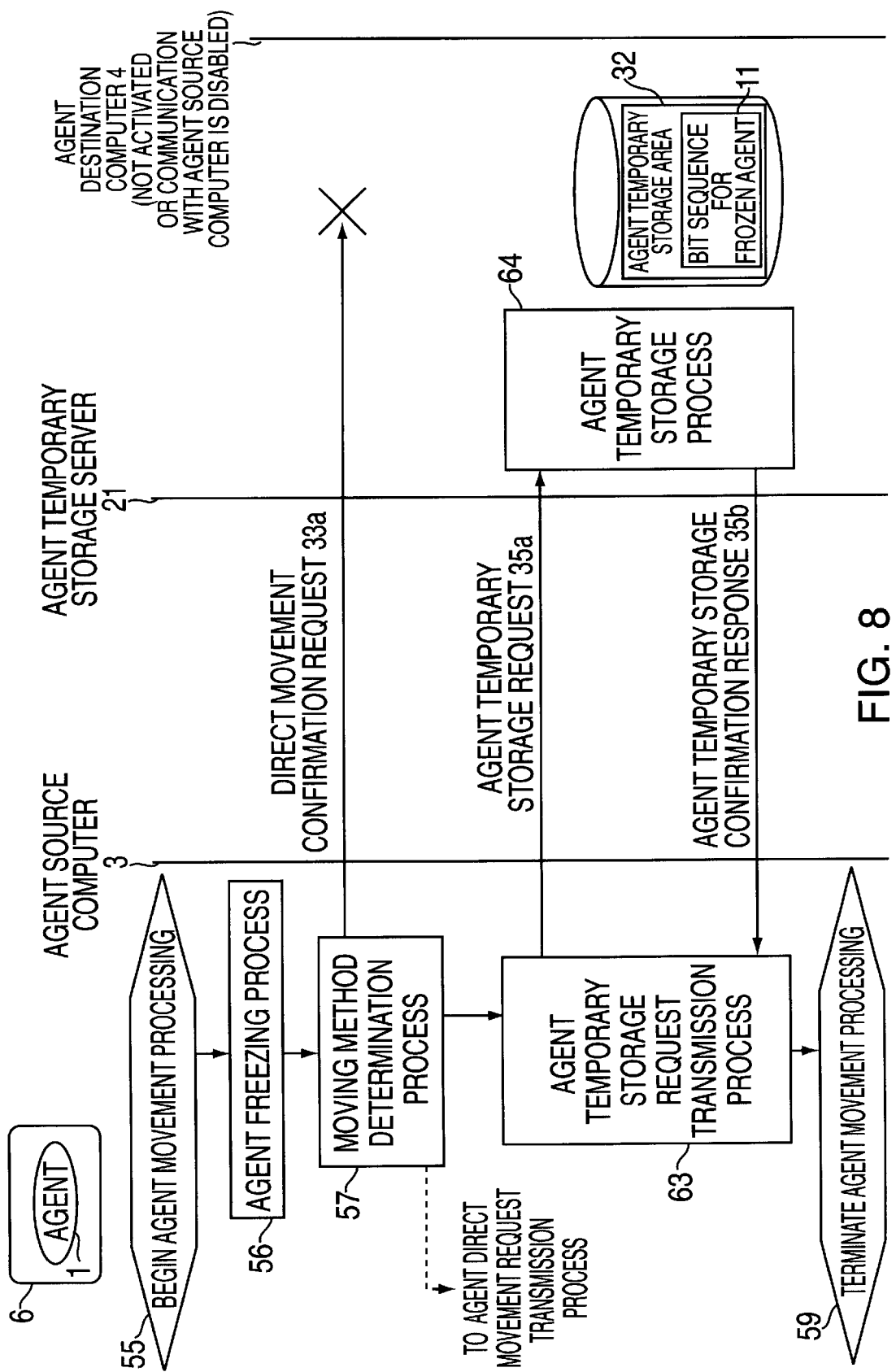
FIG. 8 is a diagram illustrating agent moving processing, in an arrangement where a temporary storage area is provided when an agent is temporarily stored in a temporary storage area.
Figure 9:
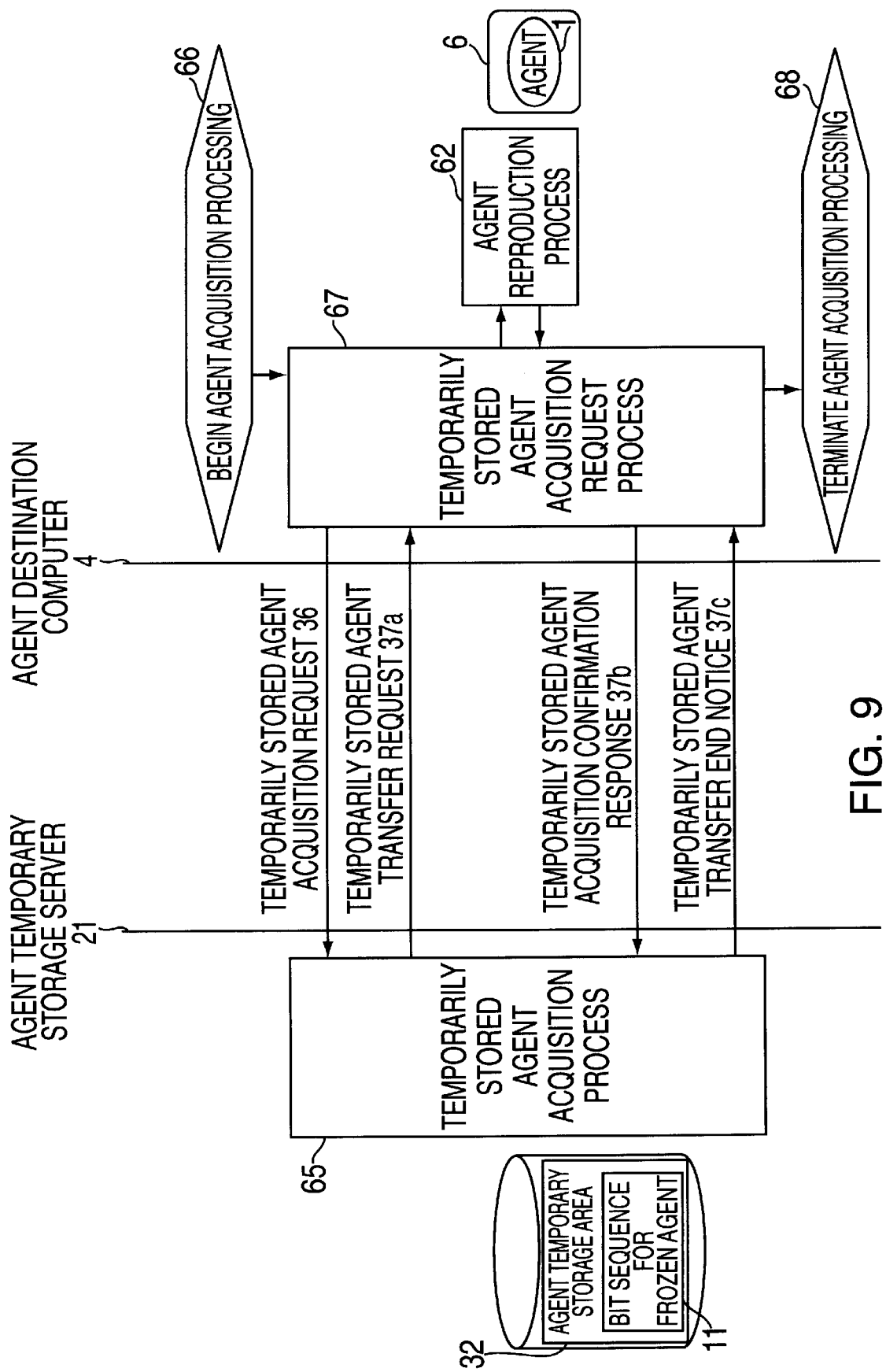
FIG. 9 is a diagram illustrating agent moving processing, in an arrangement where a temporary storage area is provided when an agent is acquired from a temporary storage area.
Figure 10:
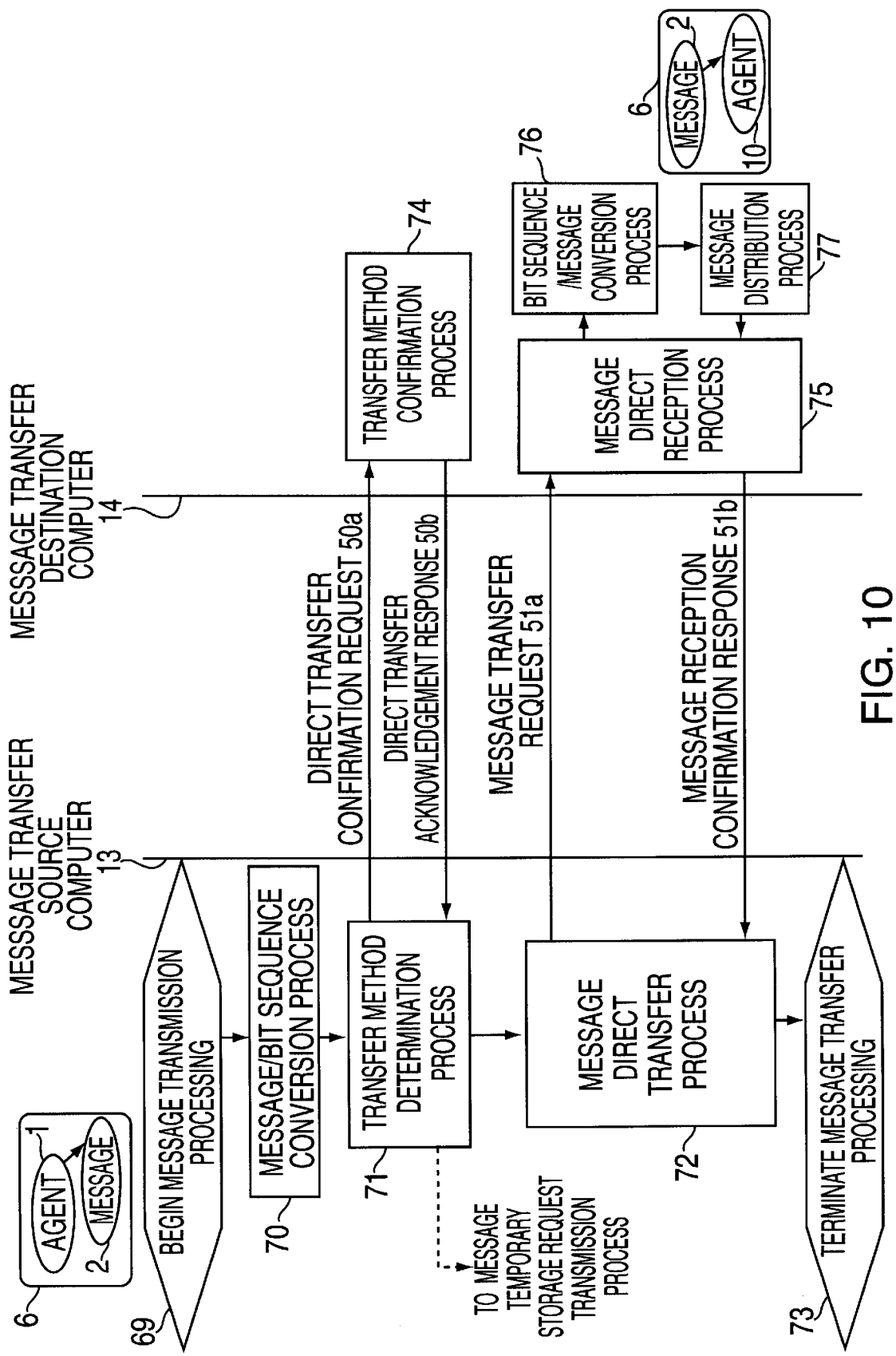
FIG. 10 is a diagram illustrating message transfer processing, in an arrangement where a temporary storage area is provided when a message can be directly transferred from a source computer to a destination computer.
Figure 11:
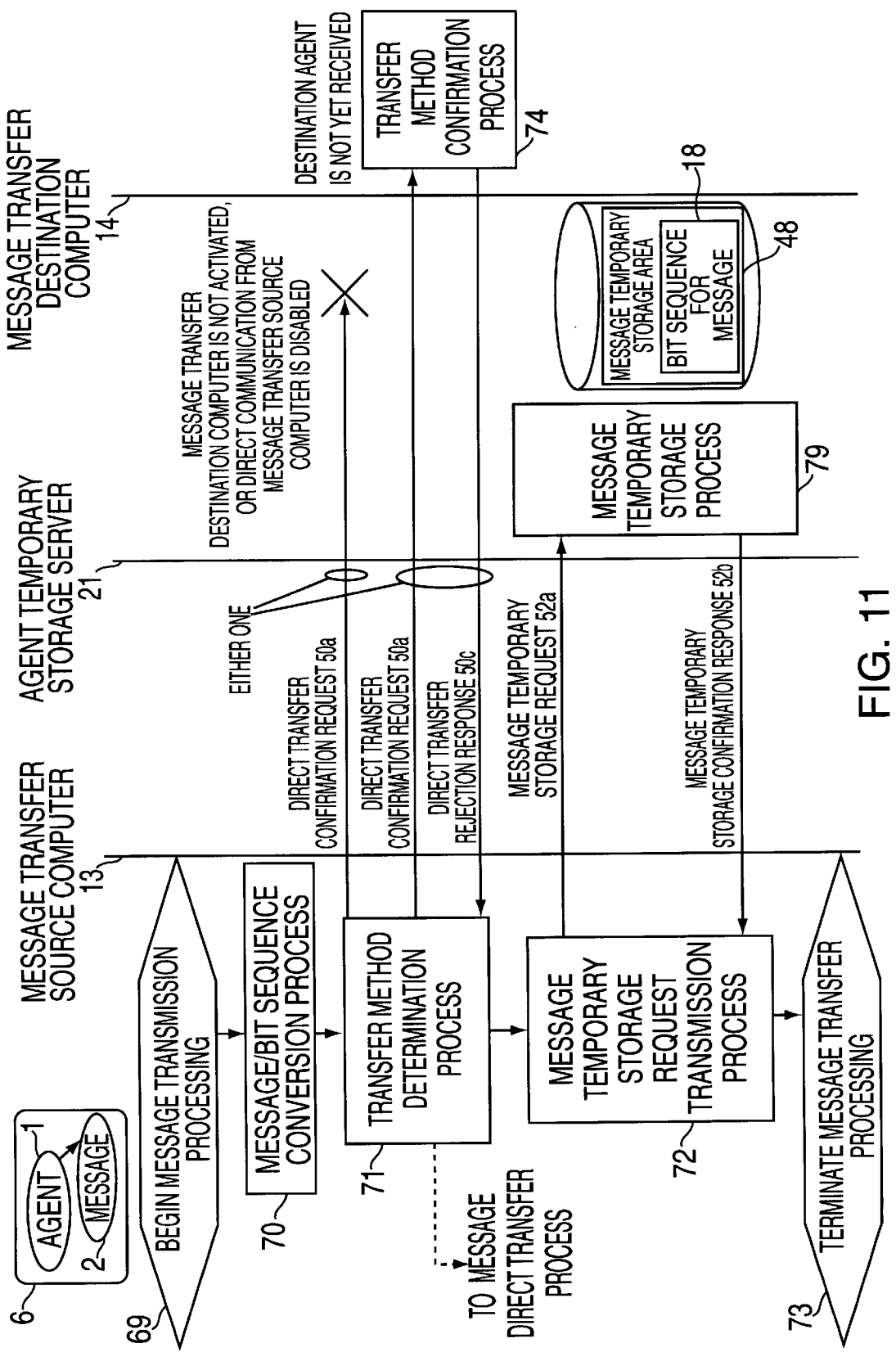
FIG. 11 is a diagram illustrating message transfer processing, in an arrangement where a temporary storage area is provided when a message is stored in a temporary storage area.
Figure 12:
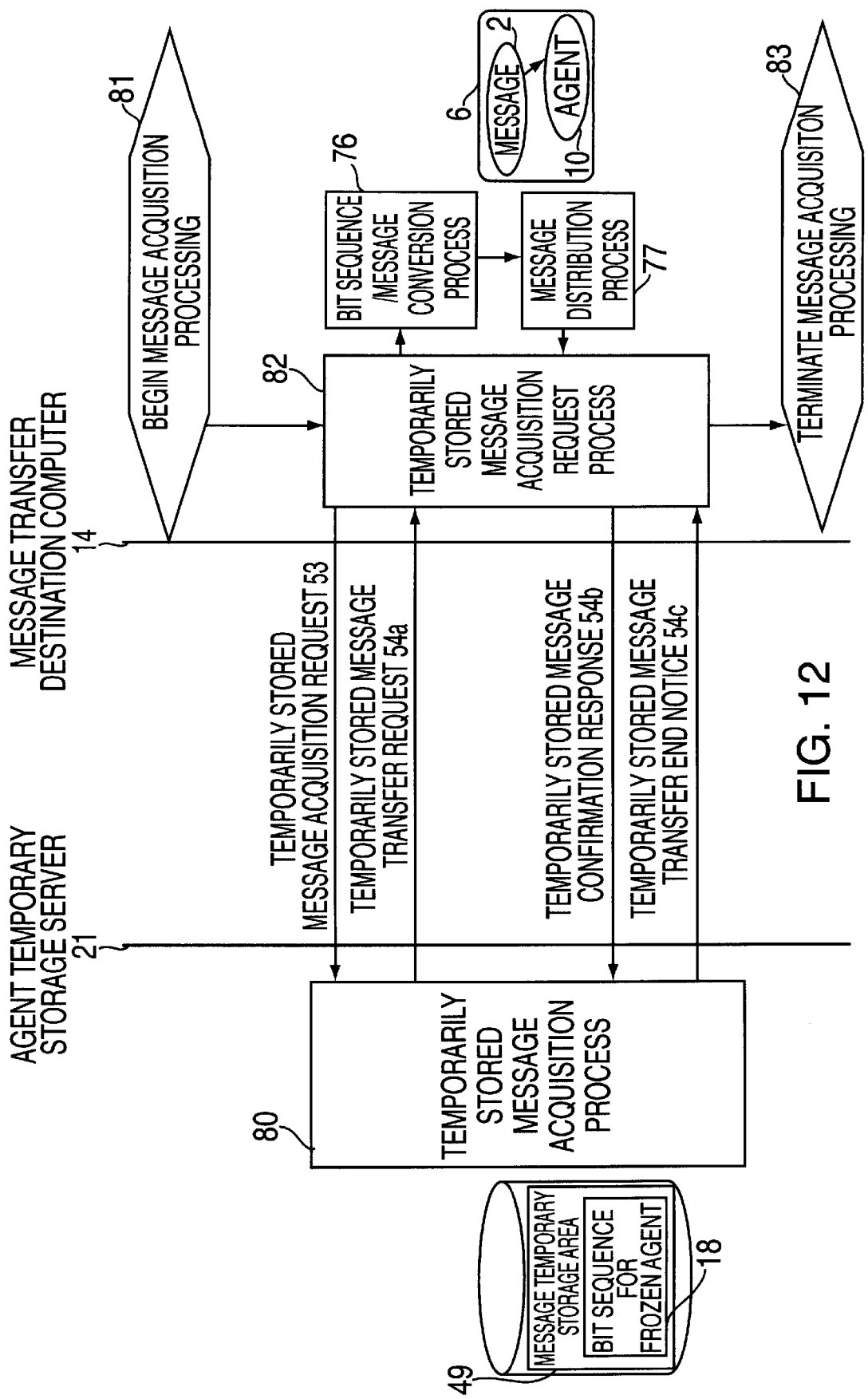
FIG. 12 is a diagram illustrating message transfer processing, in an arrangement where a temporary storage area is provided when a message is acquired from a temporary storage area.
Figure 13:
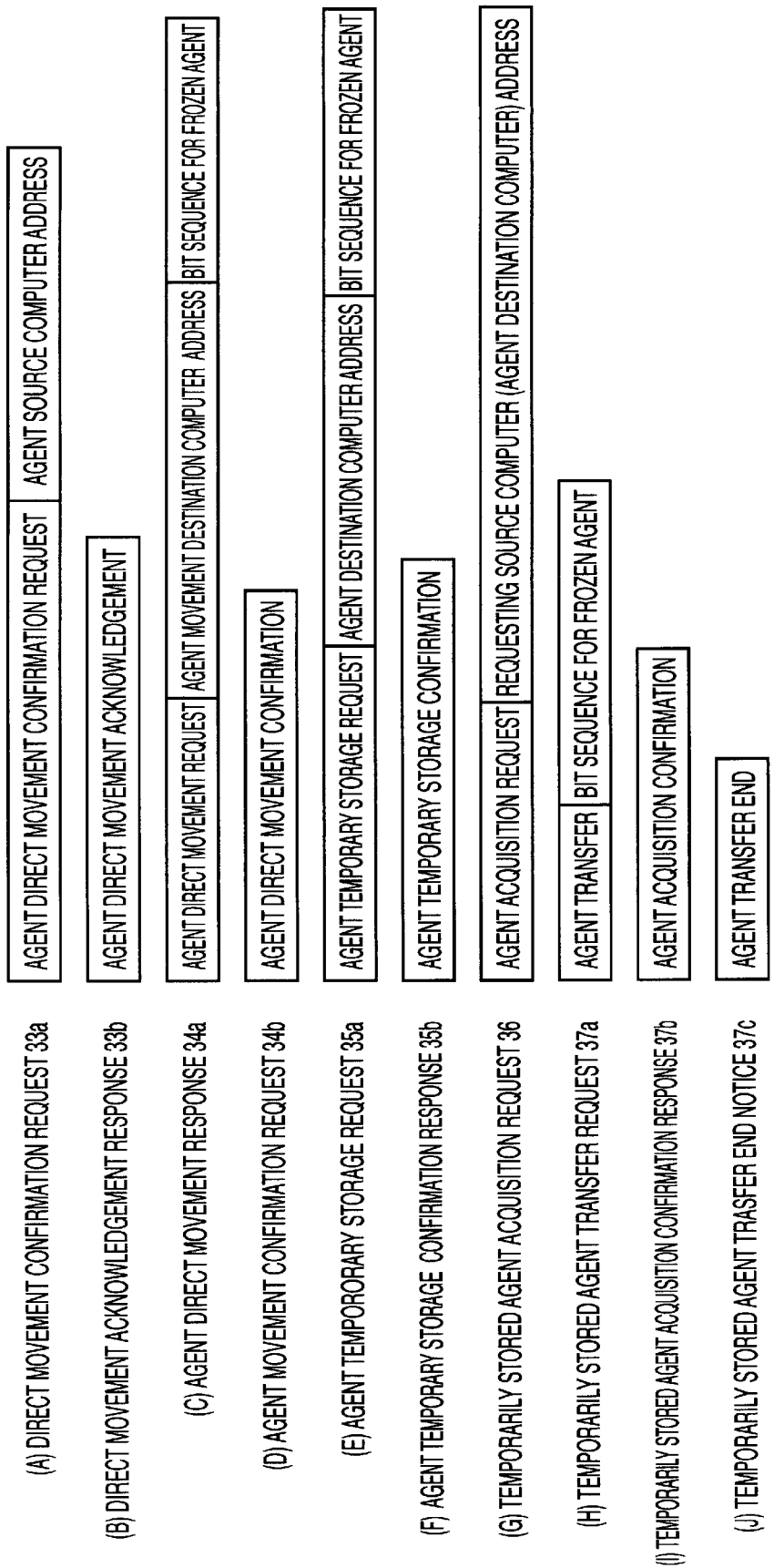
FIG. 13 is a diagram showing formats for data that are exchanged between a source computer, a destination computer and an agent temporary storage server in an agent moving arrangement where a temporary storage area is provided.
Figure 14:
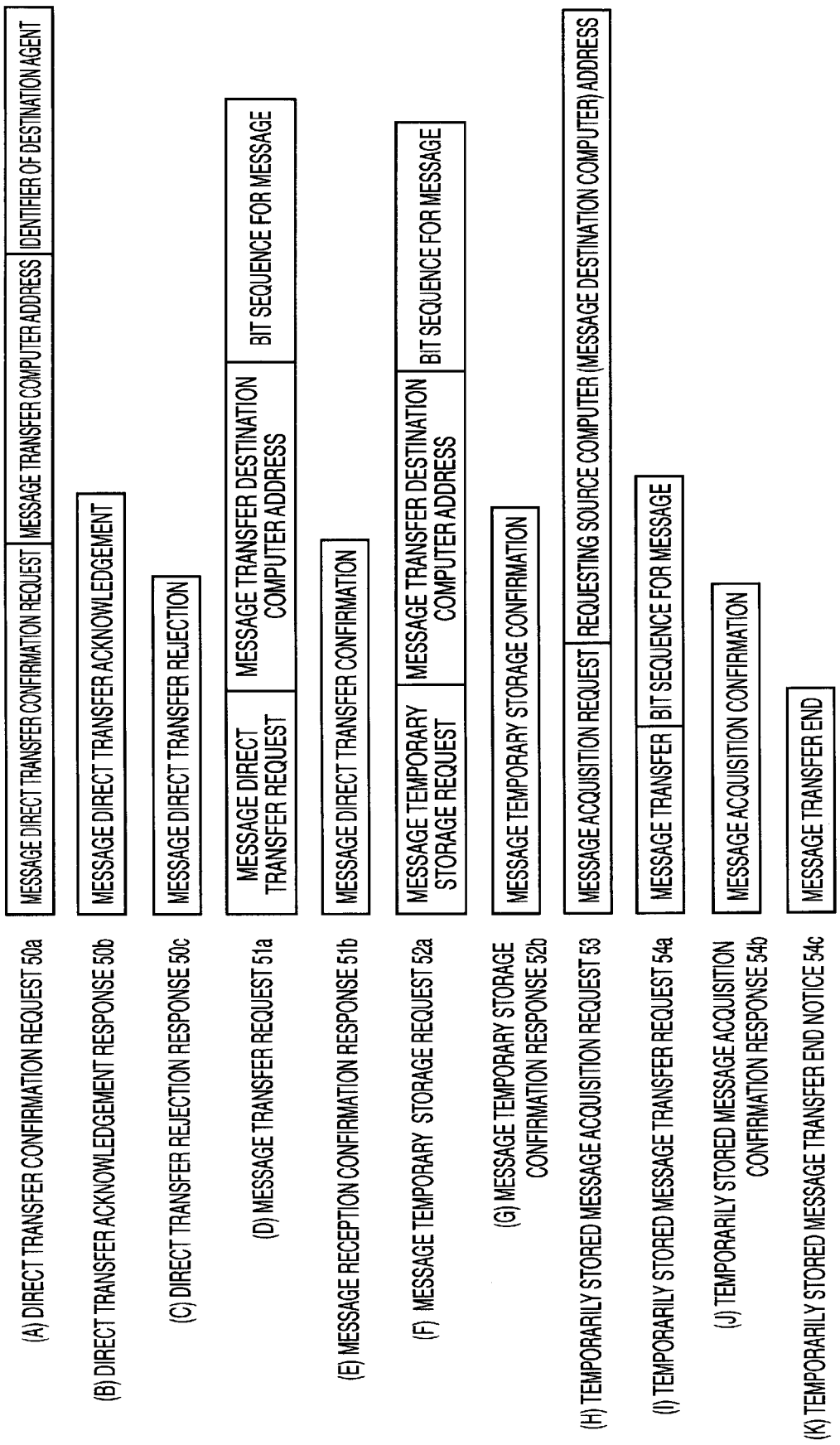
FIG. 14 is a diagram showing formats for data that are exchanged between a source computer, a destination computer and an temporary storage server in a message transfer arrangement where a temporary storage area is provided.

In the present invention, for the movement of the agent and the transfer of a message that was described referring to FIGS. 2 and 3: 1. a temporary storage area for an agent and a message is provided on the network; and 2. a mechanism is provided that transfers the message after it has confirmed that a destination agent has arrived at an agent destination computer. The outline of the arrangement where the temporary agent storage area is provided on the Internet is shown in FIG. 4; an example agent moving arrangement including the temporary storage area is shown in FIG. 5; an example message transfer arrangement including the temporary storage area is shown in FIG. 6; movement processing of an agent is shown in FIGS. 7, 8 and 9; and processing of a message transfer is shown in FIGS. 10, 11 and 12. In FIGS. 13 and 14 are shown formats for communication data that are to be transferred via the network shown in FIGS. 7 to 12.

First, FIG. 4 shows the outline of an arrangement where a temporary agent storage area for agents is provided on the Internet. On the Internet 100, it is possible to provide a plurality of servers 110 and 120 for providing temporary agent storage areas. In this case, users 134 and 140 submit registration applications, in advance, to the service provider that provides the temporary agent storage service to acquire individual temporary agent storage areas and their addresses. To transmit an agent to another computer, an agent user 130 to 140 acquires the address of the computer and the address of its temporary storage area from a target user by requesting them. The agent user who obtains the address information specifies an address to which the agent moves and moves it thereto. The agent may move directly to the destination computer, or may be stored in the temporary storage area for that computer. In addition, a user may designate an agent destination address, or an agent may already know it. The movement of the agent may be started in response to an instruction from a user or by the determination of the agent by itself. A user who receives an agent begins the processing for acquiring the agent from his or her temporary storage area at an appropriate time, by clicking a GUI button in a tool for managing an agent, or by performing an automatic acquisition process periodically.

FIG. 5 shows an example arrangement for the movement of an agent when a temporary storage area is provided. The agent source computer 3 includes a logical space 6, where the agent is active, and a transmitter 7 of an agent movement processing mechanism. The agent 1 is active in the logical space 6. The transmitter 7 of the agent movement processing mechanism comprises an agent freezing unit 22, a moving method determination unit 23, an agent direct movement request transmitter 24, and an agent temporary storage request transmitter 25. The agent freezing unit 22 performs an agent freezing process, and the moving method determination unit 23 performs a process for determining whether a mobile agent can move directly to the agent destination computer 4. There are many references available for determining whether an agent can move directly to a destination computer or not. For example, an agent can not move directly to a destination computer when the computer is not powered on or when direct access from an external network is inhibited. The agent direct movement request transmitter 24 must transmit a transfer request 34 of the bit sequence 11 for the frozen agent to the agent destination computer 4. In other words, the agent direct movement request transmitter 24 has address information of the agent destination computer 4. The agent temporary storage request transmitter 25 transmits a storage request 35 of the bit sequence 11 of the frozen agent to an agent temporary storage server 21. In other words, the agent temporary storage request transmitter 25 correspondingly stores an address of the temporary storage server 21 for the agent destination computer 4.

The agent destination computer 4 comprises a logical space 6 where an agent is active, and a receiver 8 of an agent movement processing mechanism. The receiver 8 of the agent movement processing mechanism includes an agent reproduction unit 26, a transfer method confirmation unit 27, an agent direct movement request receiver 28, and a temporary agent storage acquisition request processing unit 29. The agent reproduction unit 26 reproduces an agent 1 from a bit sequence 11 for a frozen agent, and activates it in the logical space 6. The transfer method confirmation unit 27 receives a confirmation request 33 from the moving method determination unit 23 in the agent source computer 3, and transmits a response representing whether or not direct movement is possible. The agent direct movement request receiver 28 receives the bit sequence 11 for the frozen agent that is transmitted from the agent source computer 3, and calls the agent reproduction unit 26. The temporary agent storage acquisition request processing unit 29 transmits an agent acquisition request 36 to the agent temporary storage server 21, receives the bit sequence 11 for the frozen agent that is transferred from a temporary agent storage processor 31, and calls the agent reproduction unit 26.

The agent temporary storage server 21 comprises an agent temporary storage unit 30, a temporarily stored agent acquisition unit 31, and an agent temporary storage area 32. The agent temporary storage unit 30 receives an agent temporary storage request 35, and stores the bit sequence 11 for a frozen agent in the agent temporary storage area 32. The temporarily stored agent acquisition unit 31 receives a temporarily stored agent acquisition request 36, reads the bit sequence 11 for the frozen agent from the agent temporary storage area 32, and transmits a temporarily stored agent transfer request 37 including the read bit sequence 11. The agent temporary storage area 32 is used to store the bit sequences 11 for frozen agents. A location in this area is allocated for each agent destination computer, so that when a request for the acquisition of an agent is received from an agent destination computer, which agent is to be read is understood. Bit sequences for a plurality of frozen agents can be stored in this area.

Figure 15:
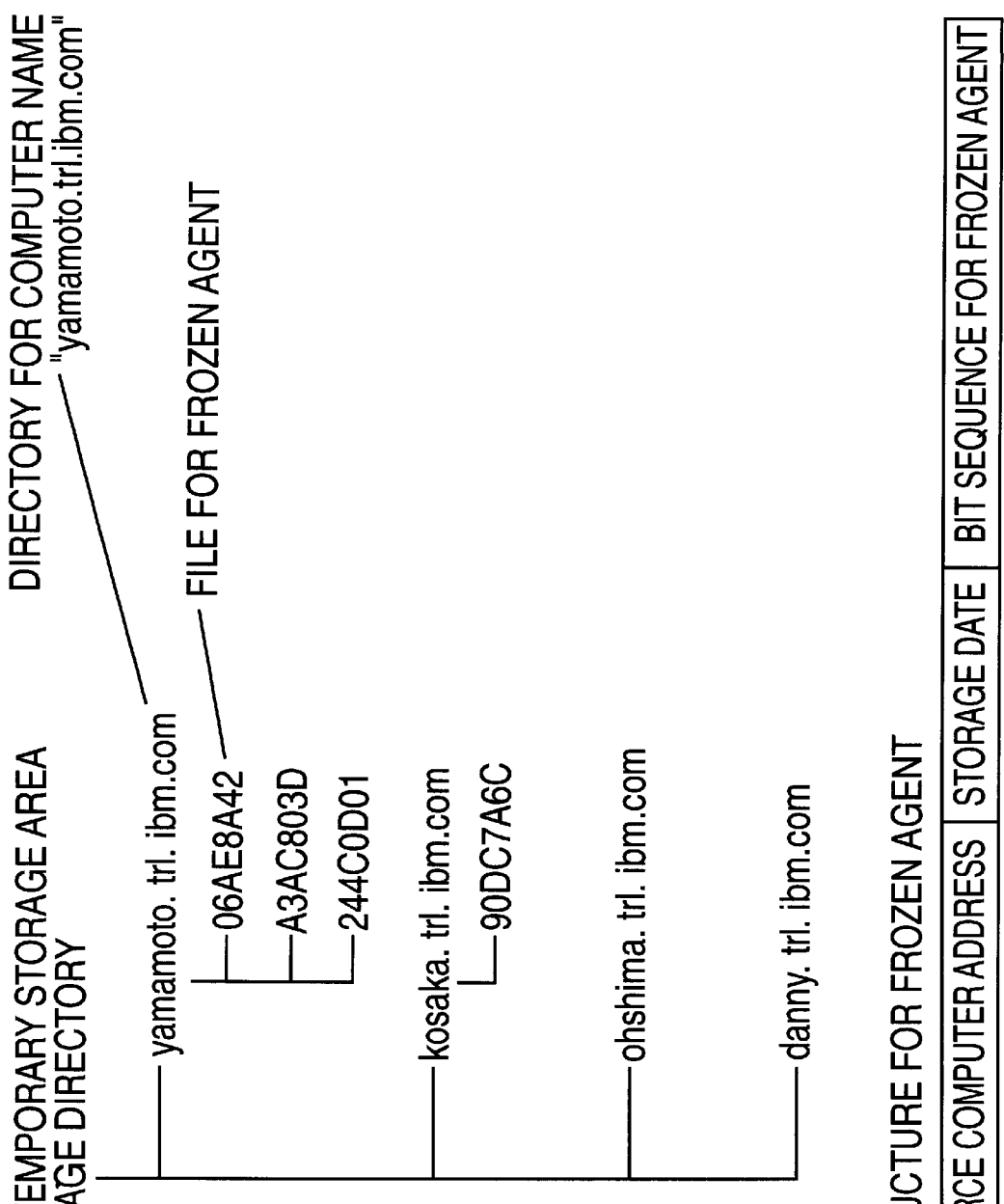
FIG. 15 is a diagram illustrating one example file structure when a temporary storage area for an agent is provided on a file system.

FIG. 15 shows an example directory structure in a storage area and an example structure of a file for storing an agent when the agent temporary storage area is provided in a file system. A directory is prepared for each computer, and a bit sequence 11 for a frozen agent is stored as a file in a directory that corresponds to the name of a destination computer. A file name is expressed by employing the identifier of the agent as a character string. At this time, information concerning a storage date and the name of a source computer is also written as the header of a file (lower portion in FIG. 15). For example, an agent that moves from "kosaka.trl.ibm.com" to "yamamoto.trl.ibm.com" is stored as a file in a directory "yamamoto.trl.ibm.com". "kosaka.trl.ibm.com" is written in the portion of the header for the source computer, and time is written into the date portion.

An example arrangement for a message transfer when a temporary storage area is provided is shown in FIG. 6. A message transfer source computer 13 comprises a logical space 6 where an agent is active and a transmitter 15 of a message transfer processing mechanism. An agent 1 is active in the logical space 6. In FIG. 6, the agent 1 transfers message 2 to an agent 1c that is active in a message transfer destination computer 14. The transmitter 15 of the message transfer processing mechanism includes a message/bit sequence converter 38 for a message, a transfer method determination unit 39, a message direct transfer unit 40, and a message temporary storage request transmitter 41. The message/bit sequence converter 38 converts the message 2 into a bit sequence 18 for the message. The transfer method determination unit 39 determines whether or not a message should be transferred directly to the message transfer destination computer 14. There are many references for determining whether or not the message can be directly transferred to the destination computer. When, for example, the destination computer is not powered on, when direct access from an external network is inhibited, or when a destination agent is stored in the temporary storage area and has not arrived at the destination computer, the direct message transfer is inhibited. In other cases, the direct message transfer is permitted. The message direct transfer unit 40 transfers a message direct transfer request 51 to the message transfer destination computer 14. In other words, the message direct transfer unit 40 possesses information concerning the address of the message transfer destination computer 14. The message temporary storage request transmitter 41 transfers a message temporary storage request 52 to the agent temporary storage server 21. That is, the message temporary storage request transmitter 41 correspondingly possesses the address of the temporary storage server 21 for the message transfer destination computer 14.

The message transfer destination computer 14 includes a logical space 6 where an agent is active and a receiver 16 of a message transfer processing mechanism. An agent 1c, which is a message transfer destination agent, is active in the logical space 6. The receiver 16 of a message transfer processing mechanism includes a message distribution unit 42, a transfer method confirmation unit 43, a message direct receiver 44, a temporarily stored message acquisition request processing unit 45 and a bit sequence/message converter 46. The message distribution unit 42 transmits a received message to the destination agent 1c. The transfer method confirmation unit 43 transmits a response relative to a confirmation request 50, which is issued by the transfer method confirmation determination unit 39 in the message transfer source computer 13, to confirm a direct transfer. The message direct receiver 44 receives a message direct transfer request 51 issued by the message direct transfer unit 40 in the message transfer source computer 13. The temporarily stored message acquisition request processing unit 45 transmits a temporarily stored message acquisition request 53 to the agent temporary storage server 21, and receives a temporarily stored message transfer request 54, which is returned as the result. The bit sequence/message converter 46 reproduces a message from the bit sequence 18 for the message received by the message direct receiver 44 and the temporarily stored message acquisition request processing unit 45.

The agent temporary storage server 21 comprises a message temporary storage unit 47, a temporarily stored message acquisition unit 48 and a message temporary storage area 49. Although not shown in FIG. 6, the server 21 includes an agent temporary storage unit 30 for temporarily storing an agent, a temporarily stored agent acquisition unit 31 and an agent temporary storage area 32, all of which were described referring to FIG. 5. The message temporary storage unit 47 receives a message temporary storage request 52, and stores the bit sequence 18 for the message in the message temporary storage area 49. The temporarily stored message acquisition request unit 48 receives a temporarily stored message acquisition request 54, reads the bit sequence 18 of the message from the message temporary storage area 49, and transmits a temporarily stored message transfer request 54 that includes the read bit sequence 18. The message temporary storage area 49 is used to store the bit sequence 18 for the message. A location in this area is allocated for each message transfer destination computer, and when a message acquisition request is received from the message transfer destination computer 14, which message is to be read is understood. Bit sequences for a plurality of messages can be stored in this area.

Figure 16:
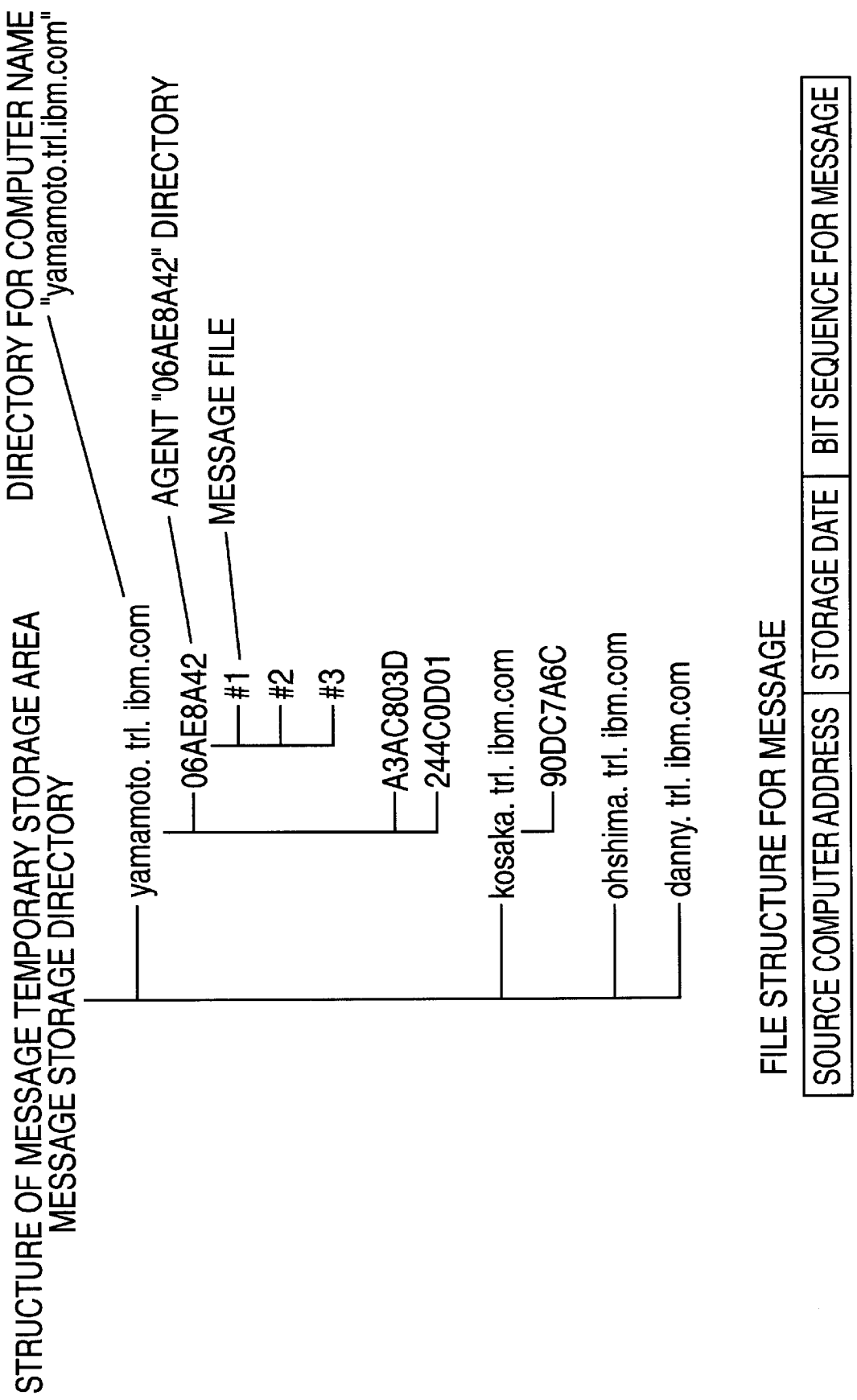
FIG. 16 is a diagram illustrating one example file structure when a temporary storage area for a message is provided on a file system.

FIG. 16 shows an example directory structure for a storage area and an example structure of a file for storing a message when the message temporary storage area is provided in the file system of a computer. A directory having the name of a computer is made, and in that directory, a sub-directory having the name that is a character string of an identifier of the destination agent for the message is prepared. When a message is stored as a file in the sub-directory, an appropriate file name is provided by the agent temporary storage server 21. In this case, the file is given a name selected from a series of sequential numbers. When the message is stored in the file, information including a storage date and the name of a transfer source computer is also written in the header of the file (lower portion in FIG. 16). Not only a file system but also a database can be employed to store a message.

The procedures employed for the agent movement method are shown in FIGS. 7, 8 and 9. FIG. 7 shows the processing performed when an agent that is active in the agent source computer 3 can be moved directly to the agent destination computer 4. FIG. 8 shows processing performed when the agent that is active in the agent source computer 3 can not be moved directly to the agent destination computer 4 and is stored temporarily. FIG. 9 shows processing performed when the agent destination computer 4 acquires an agent that was stored in the agent temporary storage server 21.

FIG. 7 is a diagram showing the processing by which the agent 1 that is active in the logical space 6 of the agent source computer 3 is moved directly to the logical space 6 in the agent destination computer 4. The movement of the agent begins upon the receipt of an instruction from a user or as a result of a decision by the agent. When the agent begins to move, first, the agent freezing unit 22 performs an agent freezing process 56, and the agent is converted into a bit sequence 11 for a frozen agent. Then, the moving method determination unit 23 performs a moving method determination process 57. During this process, a direct movement confirmation request 33a (FIG. 13(a)) is transmitted to the transfer method confirmation unit 27 in the destination computer 4. Upon reception of the request 33a, the moving method confirmation unit 27 in the destination computer 4 performs a moving method confirmation process 60. This process involves merely the return of a direct movement acknowledgement response 33b (FIG. 13(b)). Upon the reception of this response, the moving method determination unit 23 in the source computer 3 calls the agent direct movement request transmitter 24. At this time, an agent direct movement request process 58 is performed, and an agent direct movement request 34a (FIG. 13(c)), which includes the bit sequence 11 for the frozen agent, is transmitted to the agent direct movement request receiver 28 in the destination computer 4 by the agent direct movement request transmitter 24, which then waits for a response.

Upon the reception of the request 34a, the agent direct movement request receiver 28 in the destination computer 4 performs an agent direct movement request reception process 61. For this process 61, the bit sequence 11 for the frozen agent is extracted from the agent direct movement request 34a and the agent reproduction unit 26 is called to perform an agent reproduction process 62. During the process 62, the agent 1 is reproduced from the bit sequence 11 for the frozen agent so that it can become active in the logical space 6. Then, an agent direct movement request reception process 61 is performed, i.e., a process for returning an agent movement confirmation response 34b (FIG. 13(d)) to the agent direct movement request transmitter 24 in the source computer 3 and a process for recording the arrival of the agent are performed. During an agent direct movement request transmission process 58 at the source computer 3, the agent movement confirmation response 34b is received, and the agent movement process is thereafter terminated.

FIG. 8 is a diagram showing the processing performed when the agent 1 that is active in the logical space 6 of the source computer 3 can not move directly to the logical space 6 in the destination computer 4, and is stored in the agent temporary storage server 21. In the moving method determination process 57, a procedure performed until a direct movement confirmation request 33a (FIG. 13(a)) is transmitted to the destination computer 4 is the same as that explained referring to FIG. 7. In FIG. 8, however, it is assumed either that the destination computer 4 has not been activated, or that a communication path from the source computer 3 to the destination computer 4 has been disconnected. In these cases, transmission of the direct movement confirmation request 33a in the moving method determination process 57 has failed. As a consequence of the failure, it is determined that an agent temporary storage process must be performed, and the agent temporary storage request transmitter 25 is called. The agent temporary storage request transmitter 25 performs an agent temporary storage request transmission process 63. An agent temporary storage request 35a (FIG. 13(e)) is transmitted to the agent temporary storage unit 30 in the agent temporary storage server 21 and the agent temporary storage request transmission process 63 waits for a response.

The agent temporary storage unit 30 in the agent temporary storage server 21 receives the agent temporary storage request 35a, and performs an agent temporary storage process 64. In this process, the bit sequence 11 of the frozen agent is extracted from the received request, and is stored at a location in the agent temporary storage area 32 allocated for the agent destination computer 4. Following this, an agent temporary storage confirmation response 35b (FIG. 13(f)) is transmitted to the agent temporary storage request transmitter 25 that issued the request. During an agent temporary storage request transmission process 63 performed by the source computer 3, the agent temporary storage confirmation response 35b is received, and the agent movement process is thereafter terminated.

FIG. 9 is a diagram showing the processing by which the destination computer 4 acquires an agent stored in the agent temporary storage server 21. The agent destination computer 4 is automatically activated by an instruction issued by a user or by a timer and begins to acquire from the agent temporary storage server 21 an agent addressed to the computer 4. This acquisition is begun by calling the temporarily stored agent acquisition request unit 29. By this unit 29, a temporarily stored agent acquisition request process 67 is performed. For this process 67, a temporarily stored agent acquisition request 36 (FIG. 13(g)) is transmitted to the temporarily stored agent acquisition unit 31 in the agent temporary storage server 21 to wait for reception of a temporarily stored agent transfer request 37a (FIG. 13(h)). The temporarily stored agent acquisition unit 31 in the agent temporary storage server 21 performs a temporarily stored agent acquisition process 65. During this process 65, marks are provided for a group of agents and a group of messages that are currently stored to distinguish them from an agent and message that are to be received later with the agent temporary storage request 35a and the message temporary storage request 52a respectively.

An example mark could be the term ".target", which is added to the end of the name of a file used for storing an agent. For example, "06AE8A42" (FIG. 15) would be "06AE8A42.target". Similarly, for a message, a mark can be provided by adding ".target" to the end of the name of a file used for storing the message. An agent and message having such a mark would be targets for the temporarily stored agent acquisition request 36 currently processed and a temporarily stored message acquisition request 53 (FIG. 14(h)), which is transmitted immediately after the termination of the temporarily stored agent acquisition process 65. Therefore, a message for an agent, which has been transferred to the agent temporary storage server 21 during the temporarily stored agent acquisition process 65 and a temporarily stored message acquisition process 80 and will be stored until the next agent acquisition process, can be prevented from being transferred before the stored agent is transferred to the destination computer. The bit sequence 11 for the frozen agent is read from the location in the agent temporary storage area 32 that corresponds to the agent destination computer 4, which issued the temporarily stored agent acquisition request 36. The read bit sequence 11 is transmitted as a temporarily stored agent transfer request 37a to wait for a temporarily stored agent acquisition conformation response 37b (FIG. 13(i)).

Upon the reception of the temporarily stored agent transfer request 37a, the temporarily stored agent acquisition request unit 29 performs a later part of the temporarily stored agent acquisition request process 67. That is, the bit sequence 11 for the frozen agent is extracted from the temporarily stored agent transfer request 37a, and the agent reproduction unit 26 is called to perform an agent reproduction process 62. During this process 62, the agent 1 is reproduced from the bit sequence 11 for the frozen agent, and is activated in the logical space 6. Following this, in the temporarily stored agent acquisition request process 67, a temporarily stored agent acquisition confirmation response 37b is transmitted to the temporarily stored agent acquisition unit 31 in the agent temporary storage server 21, and the arrival of the agent thereat are recorded. This recorded data is employed when the message direct transfer confirmation request 50a is received from another computer.

Figure 17:
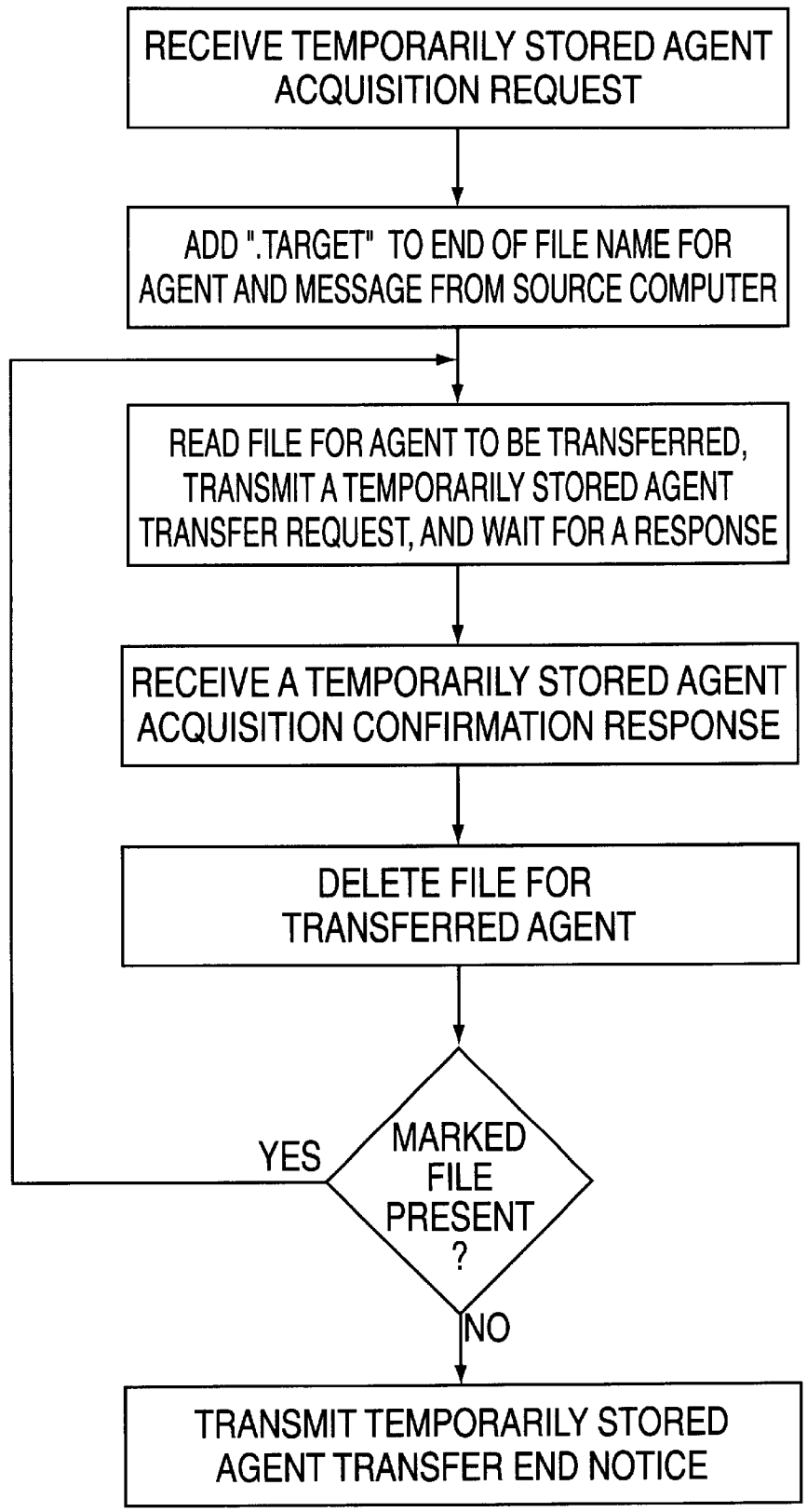
FIG. 17 is a flowchart showing a temporarily stored agent acquisition process.

When the temporarily stored agent acquisition unit 31 in the agent temporary storage server 21 has received the response 37b, it deletes the transmitted bit sequence 11 for the agent from the storage area. The deletion is performed arbitrarily, and the transmitted bit sequence 11 for the agent may be moved to another storage area. If agents with transfer target marks are still present in the agent temporary storage server 21, the temporarily stored agent acquisition unit 31 sequentially reads the bit sequences 11 for the frozen agents and transmits the temporarily stored agent transfer requests 37a until there are no agents with transfer target marks. When all the target agents have been transferred, a temporarily stored agent transfer end notice 37c (FIG. 13(j)) is transmitted to the temporarily stored agent acquisition request unit 29. Upon the reception of this notice 37c, the temporarily stored agent acquisition request process 67 is terminated, and the agent acquisition process is thereafter completed. However, an additional step of abandoning an agent that is determined to be inadequate during the acquisition request process may be performed. A flowchart for the above processing is shown in FIG. 17.

FIG. 10 is a diagram showing the processing by which an agent 1 that is active in a message transfer source computer 13 directly transfers a message 2 to an agent 1c that is active in a message transfer destination computer 14. The agent 1, which is active in the logical space 6 in the message transfer source computer 13, generates the message 2 and begins transmission of the message. Then, a message/bit sequence converter 38 performs a message/bit sequence conversion process 70 to obtain a bit sequence 18 for the message 2. Then, the transfer method determination unit 39 performs a transfer method determination process 71. During this process, a direct transfer request 50a (FIG. 14(a)) is transmitted to the transfer method confirmation unit 43 in the message transfer destination computer 14, and a response is employed to determine the transfer method.

The transfer method confirmation unit 43 in the destination computer 14, which has received the direct transfer confirmation request 50a, performs a transfer method confirmation process 74. For this process 74, if a destination agent is active in its logical space 6, a direct transfer acknowledgement response 50b (FIG. 14(b)) is returned. If there is no record that the agent has arrived, it is assumed that the agent is stored in the temporary storage area, and a direct transfer rejection response 50c (FIG. 14(c), see FIG. 11) is returned. The processing in FIG. 10 is for a case where the direct transfer acknowledgement response 50b is returned. When the transfer method determination unit 39 has received the direct transfer acknowledgement response 50b, the message direct transfer unit 40 is called to perform a message direct transfer process 72. In this process 72, a message transfer request 51a (FIG. 14(d)) is transmitted to the message direct receiver 44 in the message transfer destination computer 14. The process 72 waits for a response from the message transfer destination computer 14.

Upon reception of the request 51a, the message direct receiver 44 performs a message direct reception process 75. During this process, the bit sequence 18 for the message is extracted from the message transfer request 51a, and the bit sequence/message converter 46 is called to perform a message conversion 76 for the bit sequence 18 and reproduces the message 2. Then, the message distribution unit 42 is called to perform a message distribution process 77. In this process 77, the message 2 is transmitted to the destination agent 1c that is active in the logical space 6. Following this, a message reception confirmation response 51b (FIG. 14(e)) is returned to the message transfer source computer 13. The message direct transfer unit 40 that has received this response 51b assumes the message transfer has been completed.

FIG. 11 is a diagram showing the processing that is performed when the agent 1 that is active in the message transfer source computer 13 can not directly transfer the message 2 to the agent 1c that is active in the message transfer destination computer 14, and the message 2 is temporarily stored in the agent temporary storage server 21. The processing performed until the transfer method determination unit 39 in the message transfer source computer 13 transmits the direct transfer request 50a is the same as that explained referring to FIG. 10. In the processing in FIG. 11, however, it is assumed that the message transfer destination computer 14 has not been activated, that a communication path from the message transfer source computer 13 to the message transfer destination computer 14 has been disconnected, or that a destination agent has not arrived. In the transfer method determination process 71 performed by the transfer method determination unit 39, the transmission of the direct transfer confirmation request 50a fails if the destination computer has not been activated or if the communication path is interrupted. As a result, the transfer method determination unit 39 in the source computer 13 determines that the message should be stored in the agent temporary storage server 21. The same determination is made when the direct transfer rejection response 50c (FIG. 14(c)) is returned. As a result, the message temporary storage request transmitter 41 is called, and it performs a message temporary storage request transmission process 78. For this process 78, a message temporary storage request 52a (FIG. 14(f)) is transmitted to the message temporary storage unit 47 in the agent temporary storage server 21. The process 78 waits for a response from the agent temporary storage server 21.

Upon the reception of the request 52a, the message temporary storage unit 47 performs a message temporary storage process 79. During this process, the bit sequence 18 of the message is extracted from the message temporary storage request 52a, and is stored at a location in the message temporary storage area 48 that is allocated for the destination computer 14. Then, a message temporary storage confirmation response 52b (FIG. 14(g)) is returned. The message temporary storage request transmitter 41 receives this response 52b, and the message transfer process is thereafter terminated.

FIG. 12 is a diagram showing the processing that is performed when the message transfer destination computer 14 acquires a message stored in the agent temporary storage server 21. The message acquisition process is begun immediately after the agent acquisition has been terminated. In a temporarily stored message acquisition request process 82, the temporarily stored message acquisition request unit 45 transmits a temporarily stored message acquisition request 53 (FIG. 14(h)) to the temporarily stored message acquisition unit 48 in the agent temporary storage server 21, and waits for a temporarily stored message transfer request 54a (FIG. 14(i)). Upon reception of the temporarily stored message acquisition request 53, the temporarily stored message acquisition unit 48 performs a temporarily stored message acquisition process 80. For this process, a location in the message temporary storage area 49 is examined that corresponds to an area allocated for the computer that has issued the temporarily stored message acquisition request 53, and a message transfer process is performed for a message to which a mark is affixed. In the message transfer process 80, a temporarily stored message transfer request 54a is transmitted to the temporarily stored message acquisition request unit 45. The process 80 waits for a response from the message transfer destination computer 14.

When the temporarily stored message acquisition request unit 45 receives the temporarily stored message transfer request 54a, it extracts the bit sequence 18 for the message from the request 54a, and the bit sequence/message converter 46 is called to perform a message conversion process 76 for the bit sequence and reproduces the message. Then, a message distribution process 77 is performed by the message distribution unit 42, and the message is transmitted to the destination agent Id. Following this, in a temporarily stored message acquisition request process 82, a temporarily stored message acquisition confirmation response 54b (FIG. 14(j)) is transmitted to the temporarily stored message acquisition unit 48 in the agent temporary storage server 21.

Figure 18:
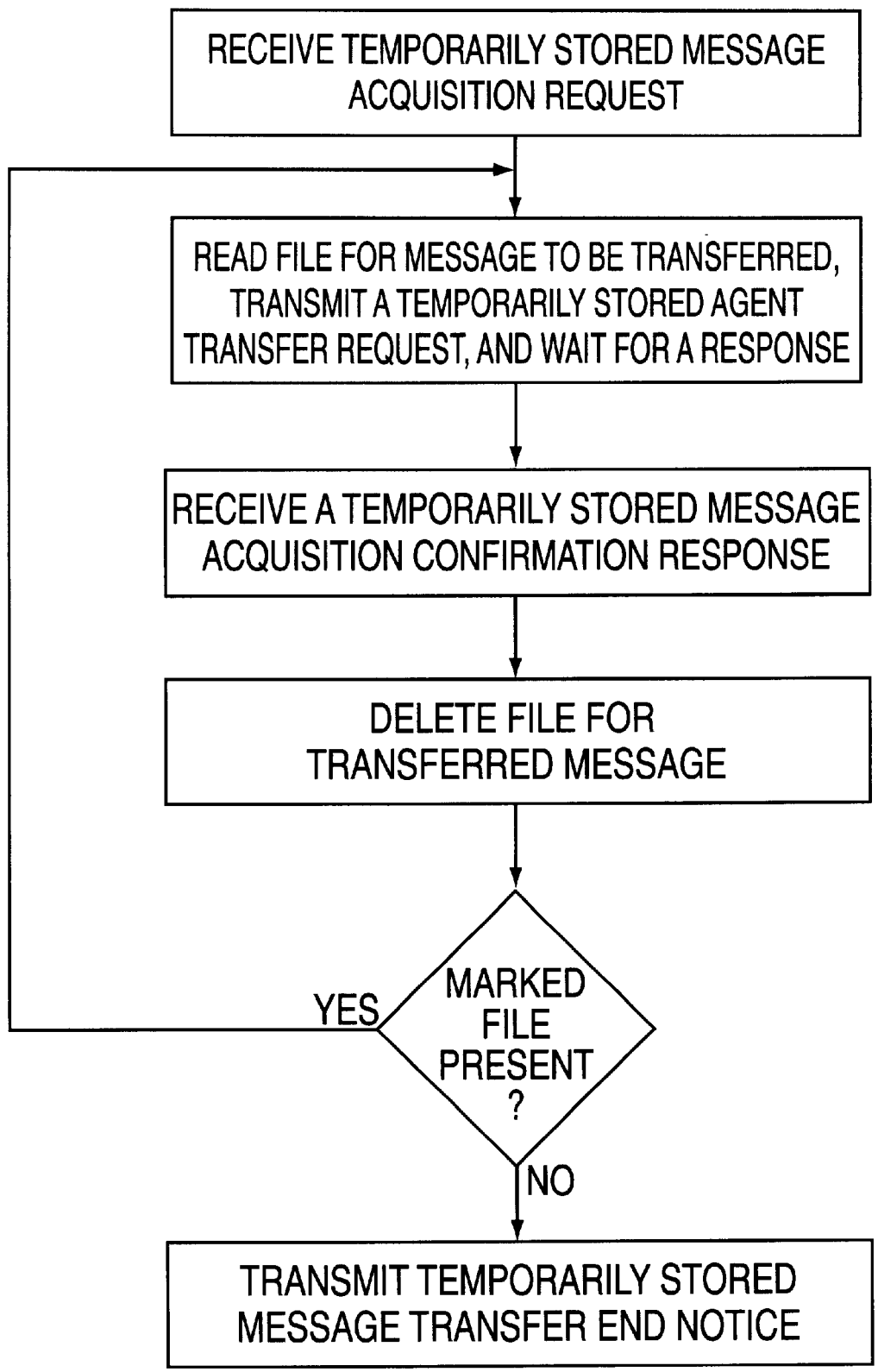
FIG. 18 is a flowchart showing a temporarily stored agent acquisition process.

Upon reception of the response 54b, the temporarily stored agent acquisition unit 48 deletes the bit sequence 18 of the transferred message. The deletion may be performed arbitrarily and the transmitted message may be stored in anther area. When there are more messages with target mark in the agent temporary storage server 21, the temporarily stored message acquisition unit 48 sequentially reads the respective bit sequences 18 for the frozen messages, and repeatedly transmits the temporarily stored message transfer requests 54a until no more messages having target marks remain. When all of the target messages have been transferred, a temporarily stored message transfer end notice 54c (FIG. 14(k)) is transferred to the temporarily stored message acquisition request unit 45. Then, the temporarily stored message acquisition request process 82 is terminated, and the message acquisition process is completed. The above described processing is shown in a flowchart in FIG. 18.

The present invention is not limited to the above described embodiment. For example, an agent and message transfer destination computer may transmit a data acquisition request, and in response to this, a temporary storage server may add marks to agents and messages stored in an area for the destination computer, and transfer the marked agents and messages to the destination computer. At this time, when an agent has first been transmitted, and after the termination of the transmission, a message may be transmitted, or an agent and a message related to the agent may be transmitted sequentially. The determination of the source computer whether or not direct movement (transmission) of an agent is possible may be performed by the agent.

Although marks may be attached to the agent and message in the temporarily stored agent acquisition process, in the temporarily stored agent acquisition process or in the agent temporary storage process, a list of stored agents and/or messages may be prepared and marks be attached in the list.

Figure 19:
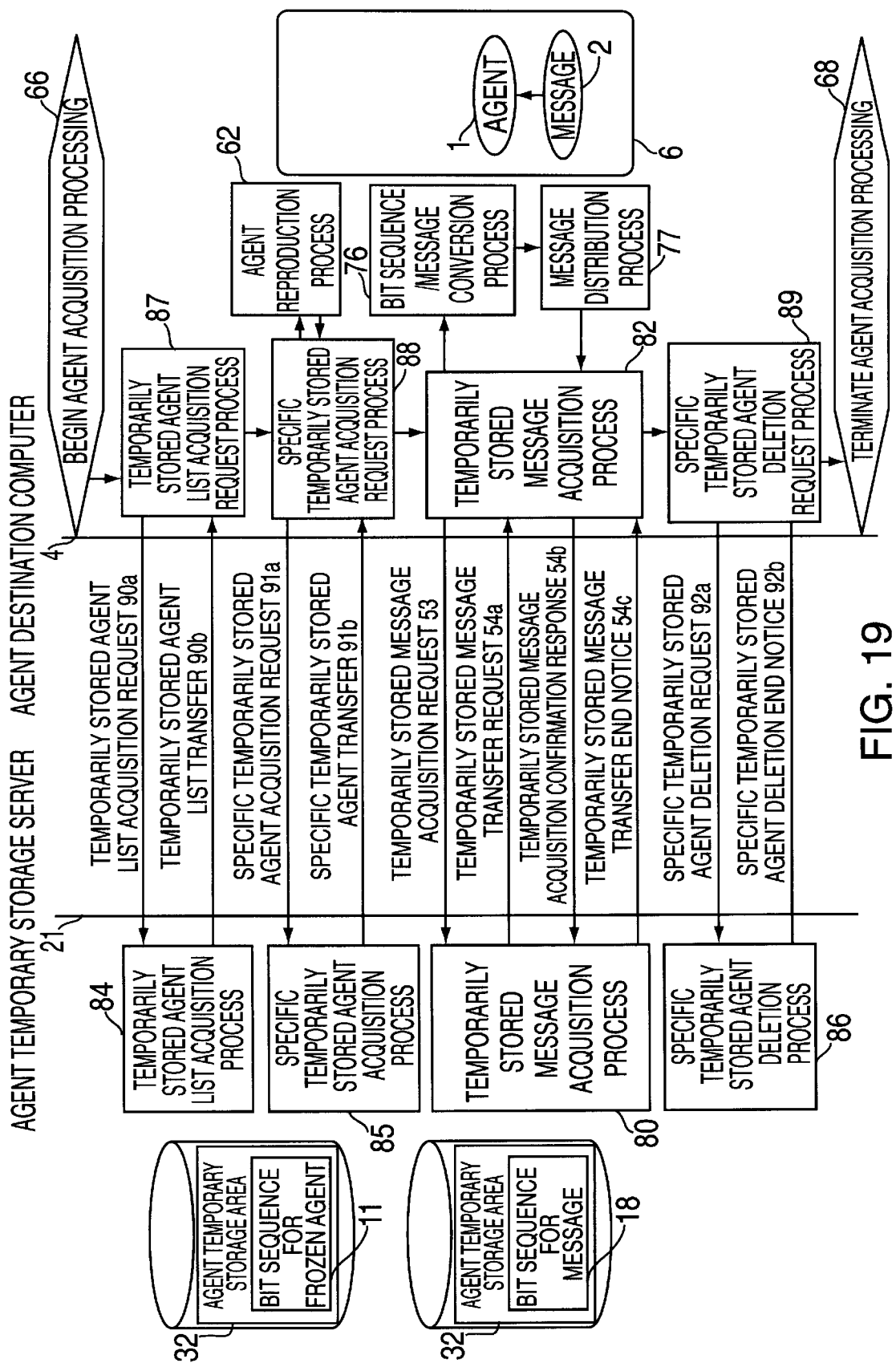
FIG. 19 is a diagram illustrating processing for acquiring an agent list, and processing for acquiring and deleting a specific agent by using the list.

Another embodiment is also provided. FIG. 19 is a diagram showing another embodiment when an agent destination computer 4 acquires a bit sequence 11 for an agent and/or a bit sequence 18 for a message from an agent temporary storage server 21. There is a case where a user of the destination computer 4 wants to select an agent stored in the temporary storage server 21 and to execute only the selected agent at the destination computer 4. The user instructs a temporarily stored agent acquisition request unit 29 (FIG. 5) to begin a temporarily stored agent list acquisition process 87. In the temporarily stored agent list acquisition process 87, a temporarily stored agent list acquisition request 90a (FIG. 20(a)) is transmitted to the temporary storage server 21. Upon reception of the request 90a, a temporarily stored agent acquisition unit 31 (FIG. 5) in the temporary storage server 21 begins a temporarily stored agent list acquisition process 84. In the list acquisition process 84, the names of agents are acquired that are stored in the storage area for a source computer of the request 90a when the list acquisition request 90a has received, and a list is prepared. When the bit sequence 11 for an agent is stored in a file system shown in FIG. 15, the file name of the bit sequence 11 for the agent is acquired in the directory of the source computer. While an agent list is referenced in this embodiment, a message list can be handled in the same manner.

Figure 20:
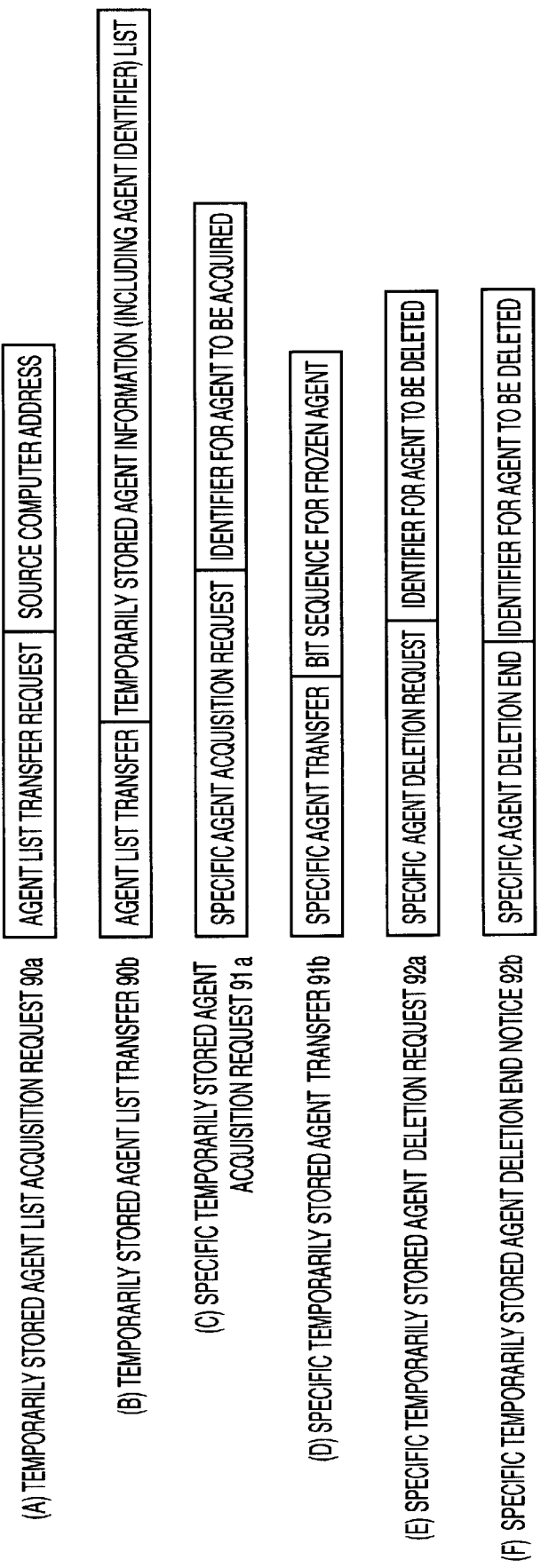
FIG. 20 is a diagram showing the format of communication data in FIG. 19.

When an agent list is prepared, the list is transmitted as a temporarily stored agent list transfer 90b (FIG. 20(b)) to the requesting source computer. In a temporarily stored agent list acquisition request process 87, the agent destination computer 4 receives the list and provides it for a user. The process 87 is thereafter terminated. The user can employ this list to determine which agents can be executed by the agent destination computer 4.

When the user selects a specific agent from the agent list, a specific temporarily stored agent acquisition request process 88 is begun. In this process 88, a specific temporarily stored agent acquisition request 91a (FIG. 20(c)), which includes the identifier of a specific agent, is transmitted to the temporary storage server 21. In response to the specific temporarily stored agent acquisition request 91a, the agent temporary storage server 21 begins a specific temporarily stored agent acquisition process 85. In the acquisition process 85, a bit sequence for a stored agent is read by using the identifier of an agent in the acquisition request 91a, and is transmitted as a specific temporarily stored agent transfer 91b (FIG. 20(d)) to the source computer. At this time, a mark would be attached to a message corresponding to a specific agent to ensure transmission of the message to the specific agent.

Upon reception of the specific temporarily stored agent transfer 91b, in the specific temporarily stored agent acquisition request process 88 the acquired agent is recorded and the bit sequence for the agent is transmitted to an agent reproduction process 62. In this process, as described above, the frozen agent is converted into a form executable in the logical space 6. A reproduced agent is activated in the logical space 6.

In the specific temporarily stored agent acquisition process 85, the transmitted agent may be deleted from the agent temporary storage area 32, or may be stored in another area.

When the specific temporarily stored agent acquisition process 85 is terminated, a message for the previously specified agent is acquired. This is the same as the previously mentioned temporarily stored message acquisition request process 82. The acquisition request process 82 and the temporarily stored message acquisition process 80 in the temporary storage server 21 exchange with each other the temporarily stored message acquisition request 53, a temporarily stored message transfer request 54a, a temporarily stored message acquisition confirmation response 54b and a temporarily stored message transfer end notice 54c, and a message to which a mark is affixed is transmitted to the destination computer 4. The message, which is received by the destination computer 4 and is addressed to a specific agent, is transmitted from the temporarily stored message acquisition process 82 to the bit sequence/message converter 76. The bit sequence/message converter 76 converts the bit sequence for the message into a form interpretable by an agent, and the message distribution unit 77 transmits it to the agent.

In FIG. 19, a user acquires a list of agents stored in the temporary storage server 21. By using this list, the user can specify undesirable agents and received agents, and can delete them from the temporary storage area 32. In such a case, a user deletes or specifies an agent and begins a specific temporarily stored agent deletion request process 89. The specific temporarily stored agent deletion request process 89 transmits a specific temporarily stored agent deletion request 92a (FIG. 20(e)) to the temporary storage server 21. In response to the deletion request 92a, the temporary storage server 21 activates the specific temporarily stored agent deletion process 86. The specific temporarily stored agent deletion process 86 refers to the identifier of an agent in the deletion request 92a to check a region in the storage area 32 allocated for the requesting source computer. When the bit sequence 11 for an agent that has the same identifier is detected, the bit sequence is deleted.

It is preferable that the region in which the bit sequence for message is stored is checked at this time because a message to a deleted agent is sometimes useless even when it is transmitted to the agent destination computer 4.

When the bit sequence for a specific agent is deleted, the specific temporarily stored agent deletion process 86 transmits a specific temporarily stored agent deletion end notice 92b (FIG. 20(f)) to the requesting computer. In response to the notice 92b, a specific temporarily stored agent deletion request process 89 in the destination computer 4 deletes an entry for the deleted agent from the temporarily stored agent list, and terminates the processing. As a result, a user will not select an agent deleted from the list.

A process for deleting the entry of a specific agent from the list is required for the specific agent acquisition request process 88 because in the specific temporarily stored agent acquisition process 85 a transmitted agent is so set that it is immediately deleted. It should be noted that a method may be employed whereby a list of temporarily stored agents is merely employed as a reference and the contents of the list is not guaranteed.

As described above, according to the present invention, it is possible to permit a mobile agent to move to a destination computer, regardless of the condition of the destination computer.

In addition, it is possible to provide a configuration that enable the reception of data in accordance with the suitability of a destination computer for the reception of a mobile agent.

Further, it is possible to perform the above operation for a message issued by a mobile agent.

While the invention has been particularly shown and described with respect to preferred embodiments thereof, it will be understood by those skilled in the art that the foregoing and other changes in form and details may be made therein without departing from the spririt and scope of the invention.

Having thus described our invention, what we claim as new, and desire to secure by Letters Patent is:

1. A method for moving an agent from a first computer to a second computer in a network connecting said first computer with said second computer and a temporary storage computer for said second computer, the method executed by said first computer comprising the steps of:

converting said agent into a bit sequence for transmission of the agent;

determining whether the second computer which is a destination of the agent can receive said bit sequence; and transmitting an address of said second computer and said bit sequence to the temporary storage computer if it is determined that said second computer cannot receive said bit sequence, said address used by the temporary storage computer for storing said bit sequence for said second computer, wherein said second computer subsequently acquires said bit sequence from said temporary storage computer and converts said bit sequence to generate said agent in said second computer.

2. The method according to claim 1, further comprising the step of:

if it is determined that said second computer can receive, transmitting an address of said second computer and said bit sequence to said second computer.

3. The method according to claim 1, wherein said checking step comprises the steps of:

transmitting a movement confirmation request including an address of said first computer to said second computer; and determining whether an acknowledgement response or a rejection response for said movement confirmation request is received from said second computer.

4. The method according to claim 3, wherein said step of transmitting a movement confirmation request includes a step of checking whether the transmission of said movement confirmation request succeeded or failed.

5. The method according to claim 1, wherein the address of said second computer is registered with the temporary storage computer for subsequent moving of the agent from the first computer to the second computer via the temporary storage computer.

6. The method according to claim 1, wherein the first computer acquires an address of said temporary storage computer for subsequent moving of the agent from the first computer to the second computer via the temporary storage computer.

7. A method for moving an agent from a first computer to a second computer in a network connecting said first computer with said second computer and a temporary storage computer for said second computer, the method executed by said second computer comprising the steps of:

determining whether said second computer can receive an agent in response to reception of an agent reception request from said first computer; and transmitting a response not representing receptibility to said first computer if said second computer cannot receive the agent, wherein said first computer converts said agent into a bit sequence and transmits an address of said second computer and said bit sequence to said temporary storage computer, said address used by the temporary storage computer for storing said bit sequence for said second computer, said second computer subsequently acquiring said bit sequence from said temporary storage computer and converting said bit sequence to generate said agent in said second computer.

8. The method according to claim 7, further comprising the steps of:

transmitting a response representing receptibility to said first computer if said second computer can receive the agent;

receiving a bit sequence for transmission of the agent from said first computer; and converting said bit sequence to generate said agent in said second computer.

9. A method for transmitting a message issued by a first agent that is active in a first computer to a destination agent of said message in a second computer via a network, said network connecting said first computer with said second computer and a temporary storage computer for said second computer, the method executed by said first computer comprising the steps of:

converting said message issued by said first agent into a bit sequence for transmission of the message;

determining whether said second computer can receive said bit sequence; and transmitting an address of said second computer and said bit sequence to said temporary storage computer if it is determined that said second computer cannot receive the bit sequence, said address used by the temporary storage computer for storing said bit sequence for said second computer, wherein said second computer subsequently acquires said bit sequence from said temporary storage computer and converts said bit sequence into said message for receipt by the destination agent in said second computer.

10. The method according to claim 9, further comprising the step of:

if it is determined that said second computer can receive said bit sequence, transmitting an address of said second computer and said bit sequence to said second computer.

11. The method according to claim 9, wherein said checking step comprises the steps of:

transmitting a transfer confirmation request including an address of said first computer and an identifier of a destination agent, to said second computer; and checking whether an acknowledgement response or a rejection response for said transfer confirmation request is received from said second computer.

12. A method for transmitting a message issued by a first agent that is active in a first computer to a destination agent of said message that is active in a second computer via a network, said network connecting said first computer with said second computer and a temporary storage computer for said second computer, the method executed by said second computer comprising the steps of:

determining whether said second computer can receive a message in response to receiving a message reception request from said first computer; and transmitting a response not representing receptibility to said first computer if said second computer cannot receive the message, wherein said first computer converts said message into a bit sequence and transmits an address of said second computer and said bit sequence to said temporary storage computer, said address used by the temporary storage computer for storing said bit sequence for said second computer, said second computer subsequently acquiring said bit sequence from said temporary storage computer for said destination agent and converting said bit sequence into said message for receipt by the destination agent in said second computer.

13. The method according to claim 12, further comprising the steps of:
- transmitting a response representing receptibility to said first computer if the second computer can receive the message;
- receiving a bit sequence for transmission of said message from said first computer;
- converting said bit sequence into said message for said destination agent in said second computer; and
- transmitting the converted massage to said destination agent.

14. A computer connected to a network, comprising:
- a conversion module for converting an agent in said computer into a bit sequence for transmission of the agent;
- a transmission confirmation module for determining whether a movement destination computer of said agent can receive said bit sequence; and
- a transmission module for transmitting an address of said movement destination computer and said bit sequence to a temporary storage computer for said movement destination computer if it is determined that said movement destination computer cannot receive said bit sequence, said address used by the temporary storage computer for storing said bit sequence for said movement destination computer, wherein said movement destination computer subsequently acquires said bit sequence from said temporary storage computer and converts said bit sequence to generate said agent in said movement destination computer.

15. The computer according to claim 14, wherein, if said agent in said computer transmits a message, said conversion module converts said message into a bit sequence for transmission of said message, and said transmission confirmation module checks whether a transfer destination computer, where a destination agent of said message is present, can receive said bit sequence for transmission of said message; and wherein, if it is determined that said transfer destination computer cannot receive said bit sequence for transmission of said message, said transmission module transmits an address of said transfer destination computer and said bit sequence for transmission of said message to a temporary storage computer for said transfer destination computer.

16. The computer according to claim 15, wherein said transmission confirmation module transmits a movement confirmation request or a transfer confirmation request including an address of said computer to said movement or transfer destination computer, and checks whether the transmission of said movement confirmation request or said transfer confirmation request is successfully completed.

17. A storage medium storing a program executed by a first computer for moving an agent from said first computer to a second computer in a network connecting said first computer with said second computer and a temporary storage computer for said second computer, said program causing said first computer to perform the steps of:
- converting said agent into a bit sequence for transmission of the agent;
- determining whether the second computer which is a destination of said agent can receive said bit sequence; and
- transmitting an address of said second computer and said bit sequence to said temporary storage computer, if it is determined that said second computer cannot receive said bit sequence, said address used by the temporary storage computer for storing said bit sequence for said second computer, wherein said second computer subsequently acquires said bit sequence from said temporary storage computer and converts said bit sequence to generate said agent in said second computer.

18. A storage medium storing a program executed by a second computer for transmitting a message issued by a first agent that is active in a first computer to a destination agent of said message that is active in a second computer via a network, said network connecting said first computer with said second computer and a temporary storage computer for said second computer, said program causing said second computer to perform the steps of:
- determining whether said second computer can receive a message in response to receiving a message reception request from said first computer; and
- transmitting a response not representing receptibility to said first computer if said second computer cannot receive the message, wherein said first computer converts said message into a bit sequence and transmits an address of said second computer and said bit sequence to said temporary storage computer, said address used by the temporary storage computer for storing said bit sequence for said second computer, and said second computer subsequently acquires said bit sequence from said temporary storage computer for said destination agent and converts said bit sequence into said message for receipt by the destination agent in said second computer.

19. The method according to claim 18, further comprising the steps of:
- transmitting a response representing receptibility to said first computer if the second computer can receive the message;
- receiving a bit sequence for transmission of said message from said first computer;
- converting said bit sequence into said message for said destination agent in said second computer; and
- transmitting the converted message to said destination agent.

* * * * *